United States Patent [19]

Mauger et al.

[11] Patent Number: 5,537,610
[45] Date of Patent: * Jul. 16, 1996

[54] MOBILE COMMUNICATION HAVING MOBILE SUBSCRIBERS, PCN NETWORK, PBX AND A LOCAL EXCHANGE

[75] Inventors: Ray H. Mauger, Enfield; Christopher Field, Chelmsford; Andrew J. Wilton, Newton Abbot, all of United Kingdom

[73] Assignee: Northern Telecom Limited, Montreal, Canada

[ * ] Notice: The portion of the term of this patent subsequent to Nov. 9, 2010, has been disclaimed.

[21] Appl. No.: 316,064

[22] Filed: Sep. 30, 1994

Related U.S. Application Data

[63] Continuation of Ser. No. 74,279, Jun. 8, 1993, abandoned, which is a continuation of Ser. No. 717,319, Jun. 18, 1991, abandoned.

[30] Foreign Application Priority Data

Jun. 18, 1990 [GB] United Kingdom ................... 9013605

[51] Int. Cl.⁶ ............................. H04Q 7/20; H04Q 7/08; H04Q 7/22; H04Q 7/26
[52] U.S. Cl. ............................... 379/58; 379/57; 379/59; 379/60; 379/62; 370/50; 370/941; 455/331; 455/541
[58] Field of Search .................................. 379/58, 62, 57, 379/59, 60, 90, 112; 395/325; 370/94, 50; 455/33.1, 54.1, 56.1

[56] References Cited

U.S. PATENT DOCUMENTS 4,675,863  6/1987  Paneth et al. ............................. 370/50

(List continued on next page.)

FOREIGN PATENT DOCUMENTS 0169726  1/1986  European Pat. Off. .
0433256  6/1991  European Pat. Off. .
2225512  5/1990  United Kingdom .
2245454  1/1992  United Kingdom .
2245455  1/1992  United Kingdom .
9102436  2/1991  WIPO ................................. 455/33.1

OTHER PUBLICATIONS

Ameritech Mobile Communications, "Ameritech Mobile Phone Service Plans and Features", Jan. 1990.
Rolle, "Mobile Radio: Heading for a European Standard", Siemens Review, Mar. 1990.
Murray, "Why Wireless Voice in the Office," Oct. 1991.
Proceedings of the National Communications Forum vol. 43 No. 2, Oct. 1989 Chicago (US) pp. 1139–1142 B. Loken et al: "OCITT Study Group XI's Activity on Personal Communications".
IEEE International Conference on Communications ICC '90 vol. 4 15 Apr. 1990, Atlanta (US) pp. 1351–1357 T. Hattori et al: "Personal Communication Concept and Architecture".
IEEE International Conference on Communcations ICC '90 vol. 1 15 Apr. 1990, Atlanta (US) pp. 228–232 K. Balasubramanya et al: "Universal Personal Telecommunications: Concept and Requirements".

Primary Examiner—Curtis Kuntz
Assistant Examiner—William D. Cumming
Attorney, Agent, or Firm—Lee, Mann, Smith, McWilliams, Sweeney & Ohlson

[57] ABSTRACT

A mobile communications network comprises a PCN network (60–64) including a plurality of radio cells under the jurisdiction of an MSC (mobile-services switching center). One or more of said cells comprise a fixed base (60, 61) for a mobile subscriber (71). Location information regarding the fixed bases being stored in a fixed location register (FLR). When the mobile subscriber roams into such a fixed base location (60, 61) a respective service type is provided. In particular, the fixed base may be a business site (60) with a PABX network. When the mobile subscriber roams into the business site, calls involving him are routed via the PCN network or rather the base station controller (BSC) thereof, which is intelligent in that it has MSC functionality located thereat. Thus a mobile phone can act as a desk phone, with all the same services provided, whilst the mobile subscriber is within the business fixed base.

11 Claims, 26 Drawing Sheets

U.S. PATENT DOCUMENTS

| | | | |
|---|---|---|---|
| 4,748,655 | 5/1988 | Thrower et al. | 379/60 |
| 4,775,999 | 10/1988 | Williams | 379/59 |
| 4,829,554 | 5/1989 | Barnes et al. | 379/58 |
| 4,833,701 | 5/1989 | Comroe et al. | 379/60 |
| 4,905,272 | 2/1990 | Van de Moriel et al. | 379/62 |
| 4,939,785 | 7/1990 | Murata et al. | 455/54 |
| 4,955,050 | 9/1990 | Yamauchi | 379/59 |
| 5,027,388 | 6/1991 | Bradshaw et al. | 379/112 |
| 5,036,531 | 7/1991 | Spear | 379/58 |
| 5,113,499 | 5/1992 | Anknev et al. | 395/325 |
| 5,140,626 | 8/1992 | Ory et al. | 379/57 |
| 5,157,715 | 10/1992 | Fischer et al. | 379/90 |
| 5,170,488 | 12/1992 | Furuya | 455/56.1 |
| 5,212,684 | 5/1993 | MacNamee et al. | 370/94 |
| 5,260,987 | 11/1993 | Mauger | 379/58 |
| 5,303,287 | 4/1994 | Laborde | 379/59 |

Fig.6. NON-LOCAL CALL - MOBILE SUBSCRIBER BUSY

Fig.8. SUCCESSFUL LOCAL CALL

Fig. 13.

COST OF SECONDARY NODE

| | 240 CHAN BSC (8 BTS's) | | | 480 CHAN BSC (12 BTS's) | | | 960 CHAN BSC (16 BTS's) | | |
|---|---|---|---|---|---|---|---|---|---|
| | SCENARIO 1 | 2 | 3 | SCENARIO 1 | 2 | 3 | SCENARIO 1 | 2 | 3 |
| CAPITAL COST | | | | | | | | | |
| STANDARD BSC  SAY | 400 | 400 | | 800 | 800 | | 1600 | 1600 | |
| SMALL MSC  SAY | | 1800 | | | 1800 | | | 1800 | |
| INTELLIGENT BSC  £300 FIXED + £250 VARIABLE = £550 PER CHANNEL | | | 348 | | | 408 | | | 528 |
| TOTAL | 400 | 2200 | 348 | 800 | 2600 | 408 | 1600 | 3400 | 528 |
| MEGASTREAM ANNUAL CHARGE | | | | | | | | | |
| SEC NODE TO BTS's | 72 | 72 | 72 | 108 | 108 | 108 | 144 | 144 | 144 |
| PRIMARY NODE TO SEC NODE* | 240 | 72 | 48 | 432 | 120 | 48 | 840 | 192 | 72 |
| TOTAL | 312 | 144 | 120 | 540 | 228 | 156 | 984 | 336 | 216 |
| ANNUAL CHARGE 10 YEAR AMORTISATION | 352 | 364 | 155 | 620 | 488 | 197 | 1144 | 676 | 269 |

* n+1 SECURITY    — 100KM PRIMARY SITE TO SECONDARY SITE

— 80% LOCAL CALLS    — 15KM SECONDARY SITE TO RADIO CELL CENTRE

— MEGASTREAM ANNUAL CHARGE
   £9K FOR 15KM + £175 PER ADDITIONAL KM

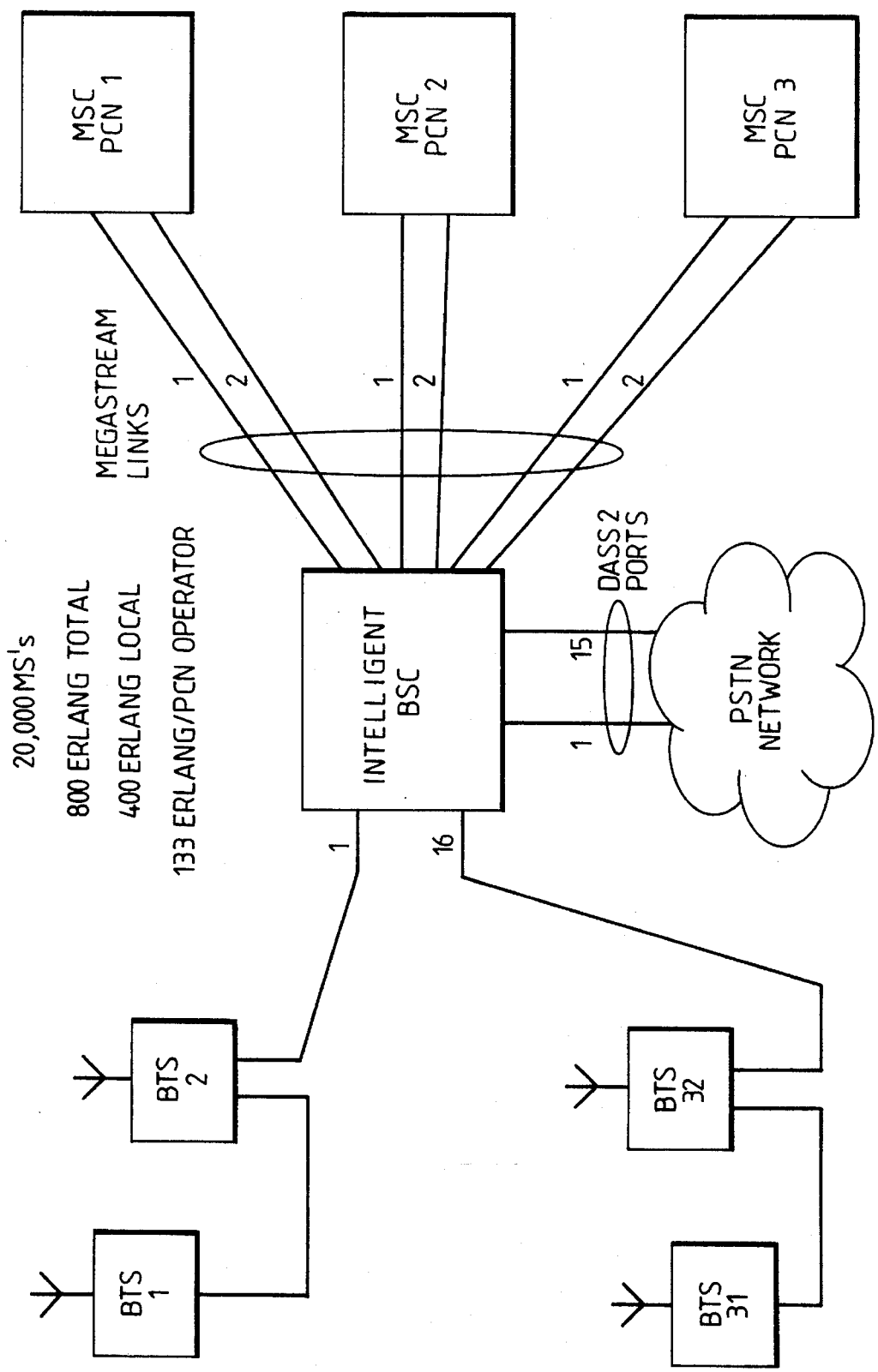

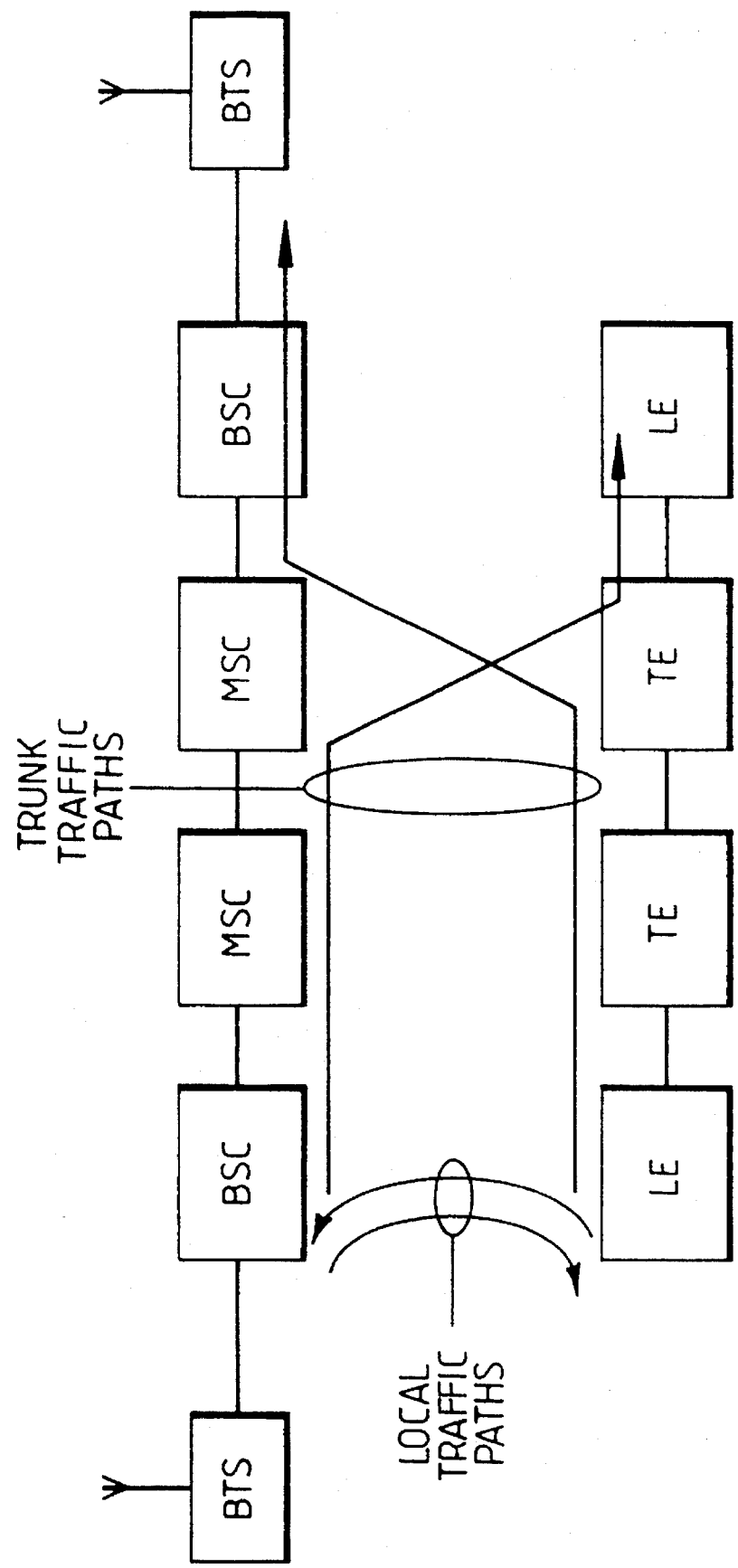

Fig. 19.

PCN NUMBER

01 — PCN OPERATOR DISCRIMINATOR
X — OPERATOR DISCRIMINATOR
YYYY — BSC DISCRIMINATION CODE
ZZZZ — SUBSCRIBER IN BSC

PCN ROUTING CODE 011 nn — NATIONAL NUMBER GROUP ALLOCATED TO PCN
YYZZZZ

TRANSLATIONS

01X — PCN ZONAL NETWORK TARIFF
     — MSC JUNCTION
DDI CODE — PCN LOCAL TARIFF
         — BSC JUNCTION
01nn — PCN INTERZONAL TARIFF
     — REMOTE MSC JUNCTION

MOBILE COMMUNICATION HAVING MOBILE SUBSCRIBERS, PCN NETWORK, PBX AND A LOCAL EXCHANGE

This application is a continuation of application Ser. No. 08/074,279, filed Jun. 8, 1993, now abandoned which is a continuation of application Ser. No. 07/717,319, filed Jun. 19, 1991, abandoned.

BACKGROUND OF THE INVENTION

This invention relates to mobile communications and in particular to extension of a communications network having mobile subscribers, especially a PCN (Personal Communication Network), network to a PABX (Private Automatic Branch Exchange).

In Europe there are currently a number of different mobile communications standards which are incompatible with one another so that a mobile terminal designed for one system cannot be used with another. The Groupe Speciale Mobile (GSM) was set up in order to develop a single cellular standard for Europe. A GSM system network basically comprises a base-station system (BSS) which includes a base-station controller (BSC) and one or more basestation transceiver stations (BTS), a mobile-services switching centre (MSC), a home location register (HLR) and a visitors location register (VLR). Every subscriber (mobile station MS) is allocated to a home network, and possibly an MSC within that network, this being achieved by making an entry in the HLR. Whenever a mobile is switched on and at regular intervals thereafter, it will register with the system and give its location area (group of cells). If the mobile is not in its home area, the subscriber's data will be added to the visitor location register of the then local MSC. In the GSM system the MSC attends to the routing of a call to its destination, each MSC being connected to other MSCs, having interfaces for connection to PSTNs (Public Switched Telephone Networks such as BT or Mercury) and other services providers, and network management etc. functions.

Personal Communication Networks (PCN) now being developed in the UK are based on GSM standards but will operate at 1.8 GHz rather than the 900 MHz of the basic GSM standards. The PCN systems arose as a result of the UK Government's Department of Trade and Industry "Phone on the Move" document which was basically aimed at improvement to current mobile communications (cellular radio telephones). The latter are analogue and restricted in capacity due to the limited band of wavelengths currently available. As a result of the UK Government freeing a higher wavelength band, nominally 2 GHz, and the use of digital techniques, improved communications can be obtained. PCNs will not however be restricted to such mobile communications, but rather are intended to support communications to and from any standard radio or fixed telecommunication network and hence to provide a single communications network with a universal personal communicator, i.e. a truly personal portable telephone which permits communication at all times. Since the PCNs proposed are based on GSM standards they can include similar components to the GSM networks referred to above, or may include variants which are compatible with both GSM and PCN networks.

SUMMARY OF THE INVENTION

According to one aspect of the present invention there is provided a mobile communications network including a PCN network and a PABX coupled to the PCN network whereby calls involving mobile subscribers associated with the PABX are routed via the PCN network.

According to another aspect of the present invention there is provided a mobile communications network comprising a PCN network including a plurality of radio cells under the jurisdiction of an MSC, wherein one or more of said cells comprise a first fixed base for a mobile subscriber, location information regarding said first fixed base being stored in a fixed location register, and wherein when said mobile subscriber roams into said first fixed base location a respective service type is applied.

BRIEF DESCRIPTION OF THE DRAWINGS

Embodiments of the invention will now be described with reference to the accompanying drawings, in which:

FIG. 13 shows cost comparisons for the three scenarios of FIG. 12;

FIGS. 14 and 15 illustrate aspects of shared infrastructure BSS Systems, and

FIG. 17 illustrates an equitable interconnect strategy;

FIG. 19 illustrates a PSTN to PCN call signalling environment;

DESCRIPTION OF THE PREFERRED EMBODIMENT

FIGS. 1 to 16 illustrate a PCN network in which local calls from a PCN mobile subscriber are directed straight to a PSTN local exchange from the BSC over a link using CCITT Q931 or national variant DASS 2 or CCITT No 7 NUP signalling, rather than being connected to the PSTN via an MSC, as is more usual for GSM type systems. This is achieved by means of a so-called intelligent BSC which is such as to recognise that a local call is involved and to route it appropriately. The intelligent BSC incorporates the basic GSM BSC function, a local MSC function and a slave location register. A transcoder is needed in the link to the PSTN local exchange (LE). The basic premise behind the operation of the intelligent BSC is that all normal MSC to MS, and vice versa, signalling passes through the intelligent BSC and that, by monitoring the messages that pass through it, the intelligent BSC is able to slave its location register off the main network location registers, without the latter being aware that this is being done, and by means of the local MSC function it is able to identify calls from the MS that are local ones and terminate them into the local PSTN exchange. Thus local calls can be charged at a local rate i.e. tariffing of calls between a mobile and a fixed network telephone can be tailored to the mobile's physical location. The basic GSM network illustrated in FIG. 1 includes the elements referred to above. i.e. mobile stations MS, Base-station systems BSS which include Base-station transceivers BTS and Base-station controllers BSC;, a mobile-services switching centre MSC, a home location register HLR, a visitors location register VLR and interfaces to other MSCs, to other networks and services and to network management (NM) functions etc. The GSM recommendations specify a 16 kbit/s voice coding scheme (9.6 kbit/s data transmission) and adopt a 64 kbit/s PCM standard message format for traffic within the GSM network beyond the A interface, which is a point defined between the BSC and the MSC. This requires a transcoder within the network to support those signal format changes. In the basic GSM arrangement illustrated, a call made by a mobile station MS to a fixed telephone connected to a PSTN network has to be processed through the relevant BTS, BSC and MSC to the PSTN even if the fixed telephone is actually local to the mobile station MS or rather the associated BSC. The charges incurred in making such calls will thus be high since transmission to the MSC, which may be some considerable distance away from the BSC, will be over fixed lines (2 Mbit/s links) which are expensive to provide or rent from existing public telephone operators (e.g. BT or Mercury).

Figure 2A:
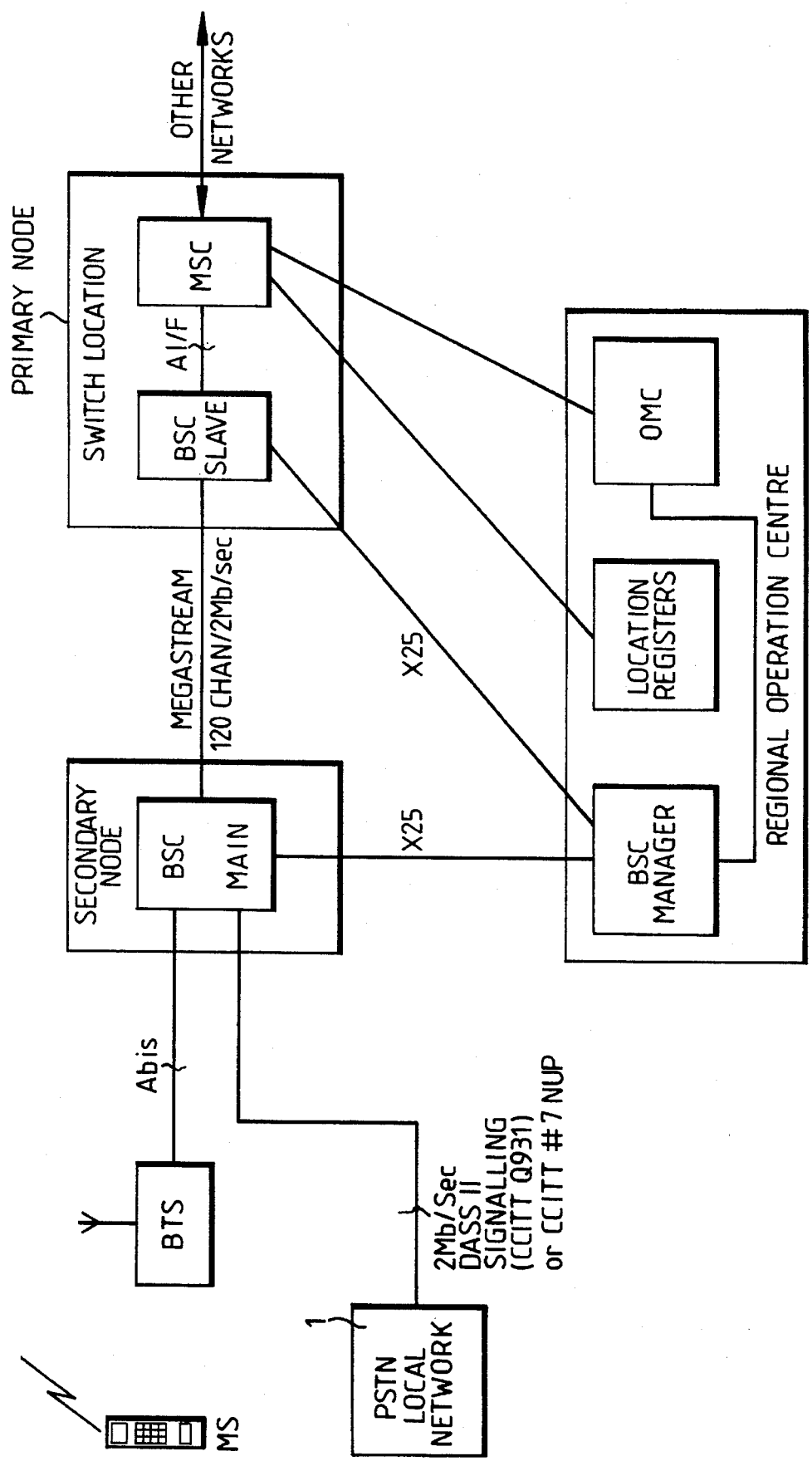
FIG. 2a illustrates a conceptual PCN network on which the present invention is based.
Figure 2B:
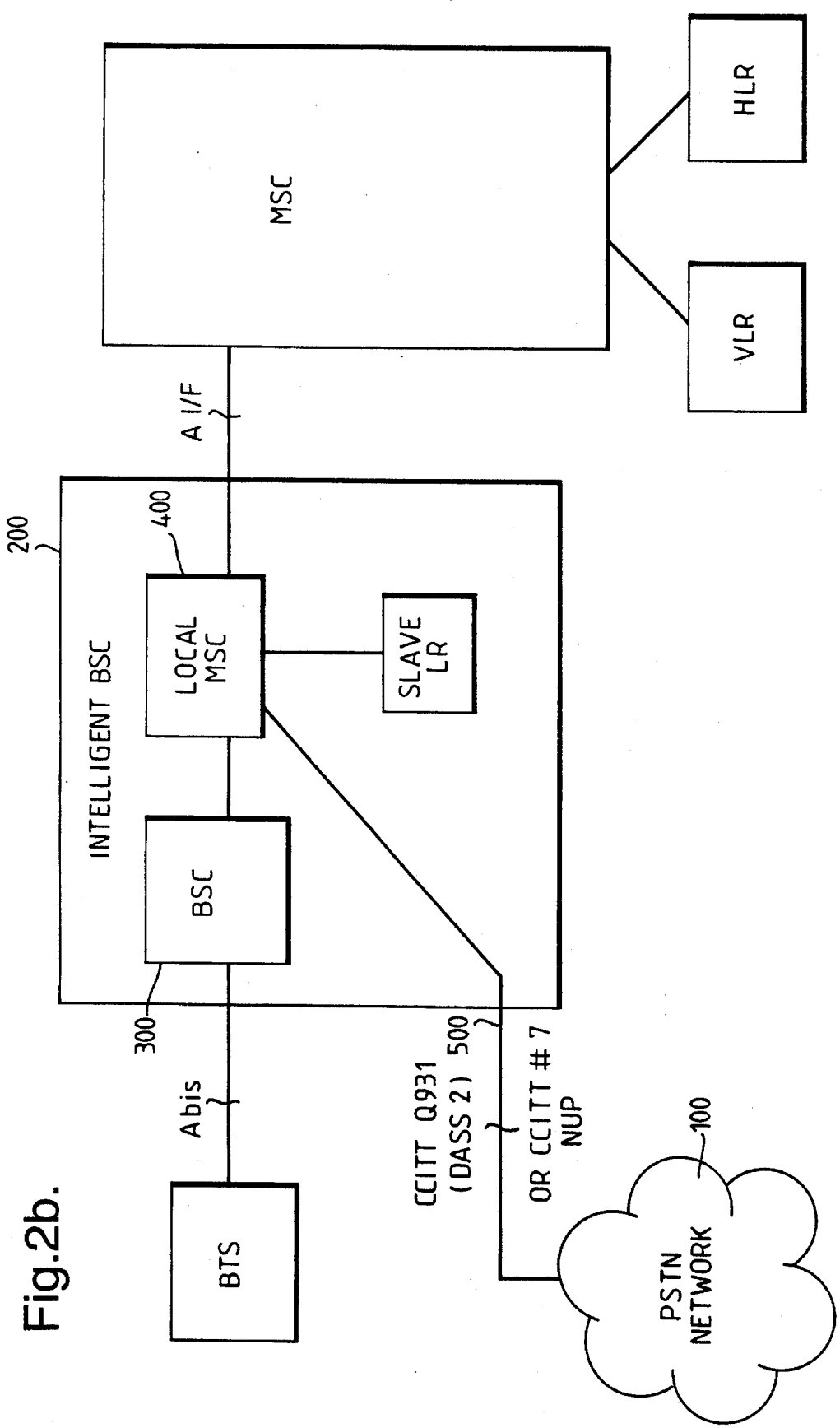
FIG. 2b illustrates part of the network of FIG. 2a in an alternative format and in particular an intelligent BSC.

The PCN network illustrated in FIG. 2a and 2b is such that for local calls the MSC is not involved in the actual call processing but rather the BSC recognises that a local call is involved and connects the call directly to the local PSTN network 1. The secondary node of FIG. 2a is the switching centre which provides the role of the BSC in the GSM recommendation. The secondary node controls a number of BTSs and routes traffic to the primary node which contains a transcoder function, an MSC and some associated node specific functions. It also contains the location registers which are used to locate and track subscribers MSs within the PCN. The overall network architecture is as shown in FIG. 2a. In this case the transcoder is implemented external to the BSC at the A interface to the MSC. The link between the BTS and BSC functions includes the A bis interface. The BmS/BSC and BSC/MSC links are, typically, rented 120 channel 2 Mb-t/s Megastream links. Flexible multiplexers, e.g. STC's PDMX, Can be employed to combine links from low traffic areas in order to maintain 120 channels per Megastream. To recognise that a local call is involved the BSC element of the GSM network is replaced by a so-called intelligent BSC 2 (FIG. 2b) which incorporates the basic GSM BSC function 3, a local MSC function 4 and a slave location register LR. The local PSTN network 1 is connected to a port of the intelligent BSC and thence to the local MSC function 4 via link 5. A transcoder (not shown) will also be needed at the BSC in link 5 to get out to PSTN network 1 (local exchange). The local access signalling over link 5 may be CCITT Q931 or national variant, e.g. DASS 2, or CCITT No 7 NUP (National User Part). The basic premise behind the operation of the intelligent BSC is that all normal MSC to MS, and vice versa, signalling passes through the intelligent BSC and that, by monitoring the messages that pass through it, the intelligent BSC is able to slave its location register off the main network location registers, without the latter being aware that this is taking place, and by means of the local MSC function it is able to identify calls from the MS that are local ones and terminate them into the local PSTN network 1. Thus local calls can be charged at a local rate i.e. tariffing of calls between a mobile and a fixed network telephone can be tailored to the mobile's physical location.

The signalling processes involved in achieving this differ from those required by the GSM signalling standard (GSM 09.09) in certain respects various examples of call set up etc. involving the intelligent BSC will now be described with reference to FIGS. 3 to 8.

Figure 3A:
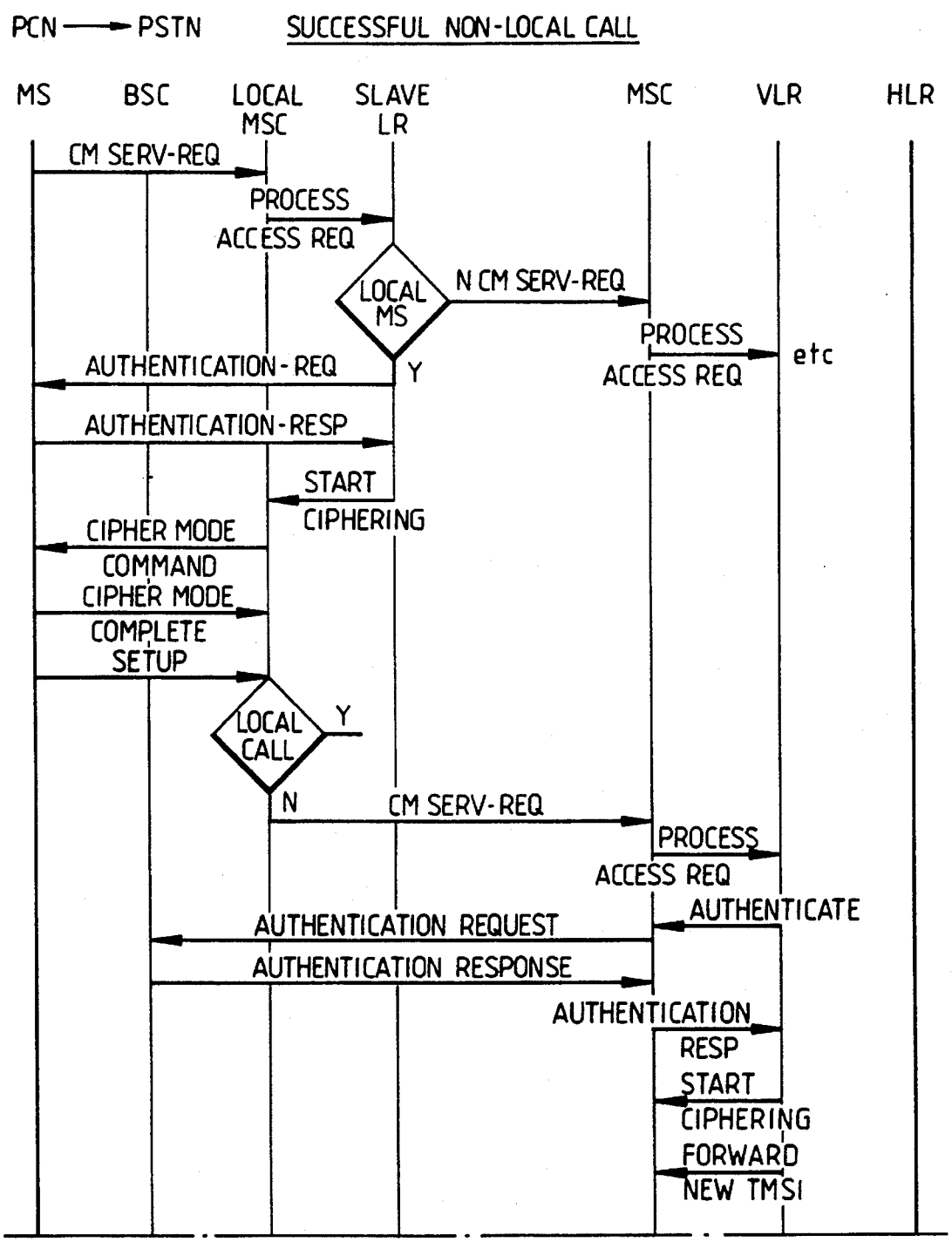
FIGS. 3 to 8 illustrate signalling messages involved for a PCN network incorporating the intelligent BSC.
Figure 3B:
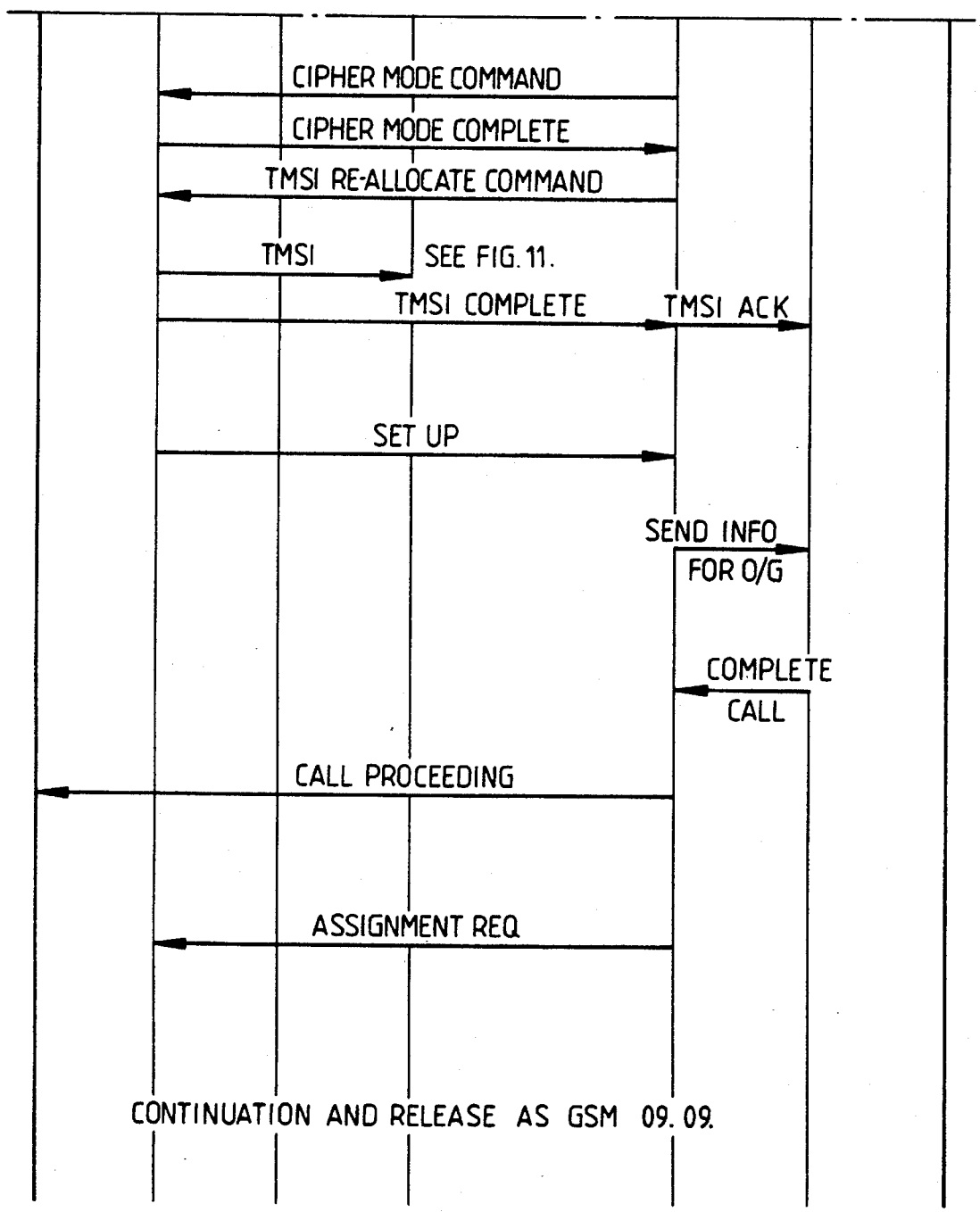

FIG. 3 illustrates a successful non-local call made between a PCN subscriber (MS) and a PSTN subscriber, i.e. an MS originating call The first message is CM SERV REQ (CM. Services Request) which the MS sends to the BSS and which in GSM is then sent to the MSC. This message does not contain any confidential information rather it contains service identity, classmark and mobile identity. In PCN, however, the CM SERV REQ message is sent to the local MSC which as a result sends PROCESS ACCESS REQ message (access request) to the slave LR which then checks to determine if the mobile station MS is a local one. If it is not a local one the CM SERV REQ message is passed on to the MSC as in the normal GSM procedure and an access request to the MSCs VLR moce in the normal GSM manner and the call proceeds as normal. The MSC will not have been aware that the intelligent BSC had intercepted call message. If the call was from a local MS, the GSM authentication procedure is followed but activated by the slave LR rather than the MSC's VLR. This comprises an Authentication request (Req) message from the slave LR to the MS and an Authentication response (resp) message from the MS to the slave LR. If authentication was successful the slave LR requests the local MSC to Start ciphering procedures. The message contains ciphering information and also indicates whether ciphering is used or not. A Cipher mode command message is sent from the local MSC to the MS which returns a cipher mode complete message to the local MSC to indicate that the appropriate action on ciphering and deciphering has been started by the MS and the BSC. The MS then sends SETUP message, which contains confidential call information e.g. called party address (identity), to the local MSC which checks if it is a local call or not. If it is not a local call then the whole procedure is repeated but with the BSC emulating the role of the MS, as indicated in FIG. 3, so that the interface to the MS is not changed but emulated within the BSC in order to preserve the A interface. In this case there is also a request from the MSC's VLR to the MSC to forward new TMSI (temporary mobile subscriber identity), if reallocation of the TMSI is wished. The TMSI reallocate command for the MSC to the BSC transfers the value of the new TMSI in ciphered moae The TMSI is also transferred from the BSC to the slave LR as indicated and is used in the release procedure described hereinafter with reference to FIG. 7. The BSC then sends a TMSI reallocation complete message to the MSC and a TMSI reallocation acknowledge message is sent to the MSC'S VLR. The setup messaae passes from the BSC to the MSC and the MSC sends a send information for O/G call set-up message to its VLR i.e, a request for subscriber parameters. The VLR sends a complete call message to the MSC, i.e. sends the subscriber information to the MSC, and the MSC sends a call proceeding message to the MS to indicate that the call is being proceeded. The MSC sends an assignment request to the BSC, the MSC seizing a terrestrial channel and asking the BSC to seize a radio channel as a result. Call continuation and release now proceeds as in GSM 09.09.

Figure 4:
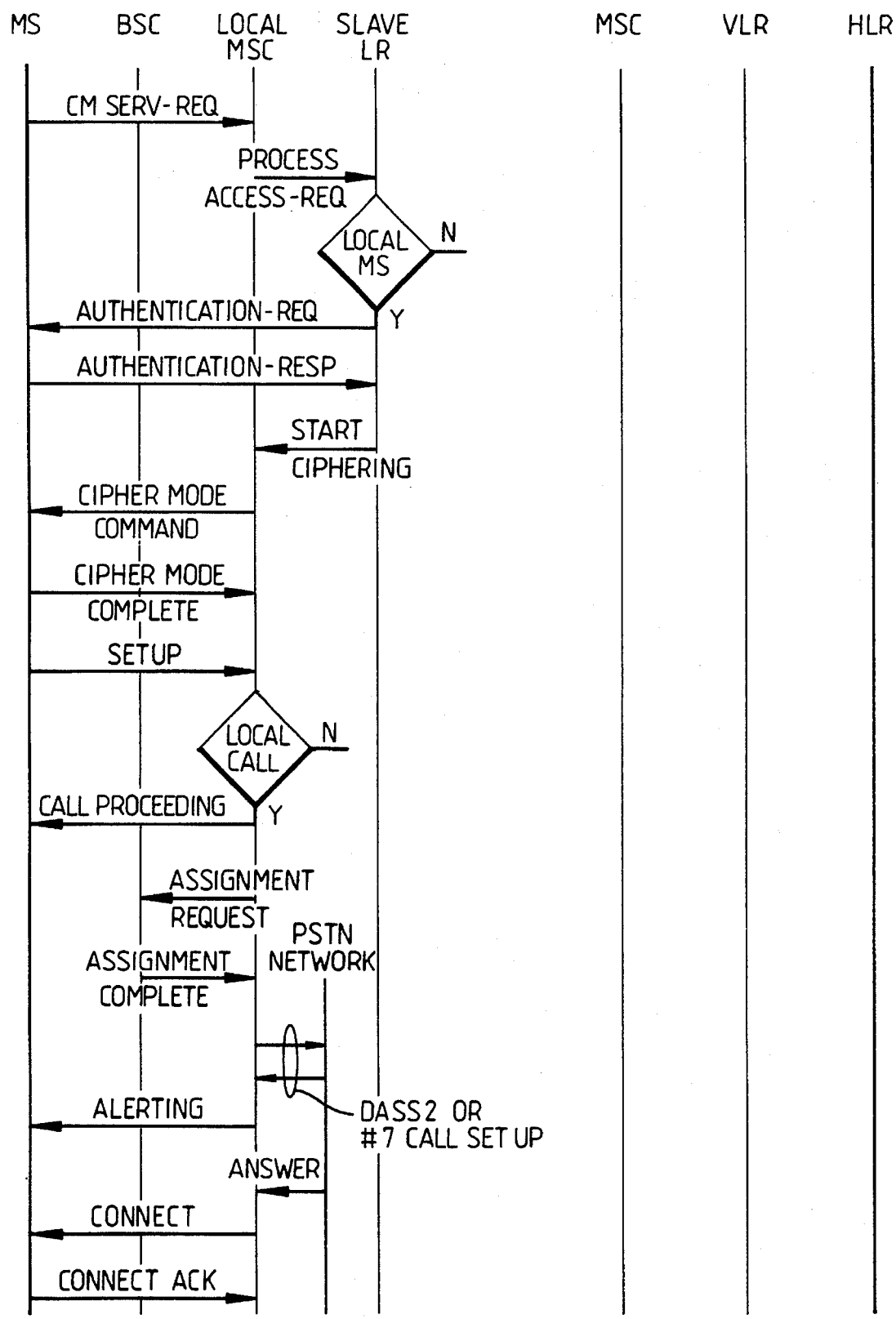

FIG. 4 illustrates the case where there is a successful PCN to PSTN local call. The first part of the signalling procedure, establishing that the MS is local, authentication, cipher procedure and setup is the same as FIG. 3. The answer to the question "is the call a local one?" is "yes" in this case, and the call proceeding message is sent from the local MSC to the MS together with the assignment request to the BSC which responds with an assignment complete message to the local MSC. The local MSC then employs CCITT Q931 or national variant, e.g. DASS 2, or CCITT No 7 NUP signalling to set the call up to the local PSTN network 1, resulting in an answer message when the called subscriber answers, a connect message from the local MSC to the MS to inform the latter that the call has been accepted by the called subscriber and a connect acknowledgement message from the MS to the local MSC. Call release proceeds as in GSM 09.09. The MSC is not aware in this case that a call has been made.

Figure 5:
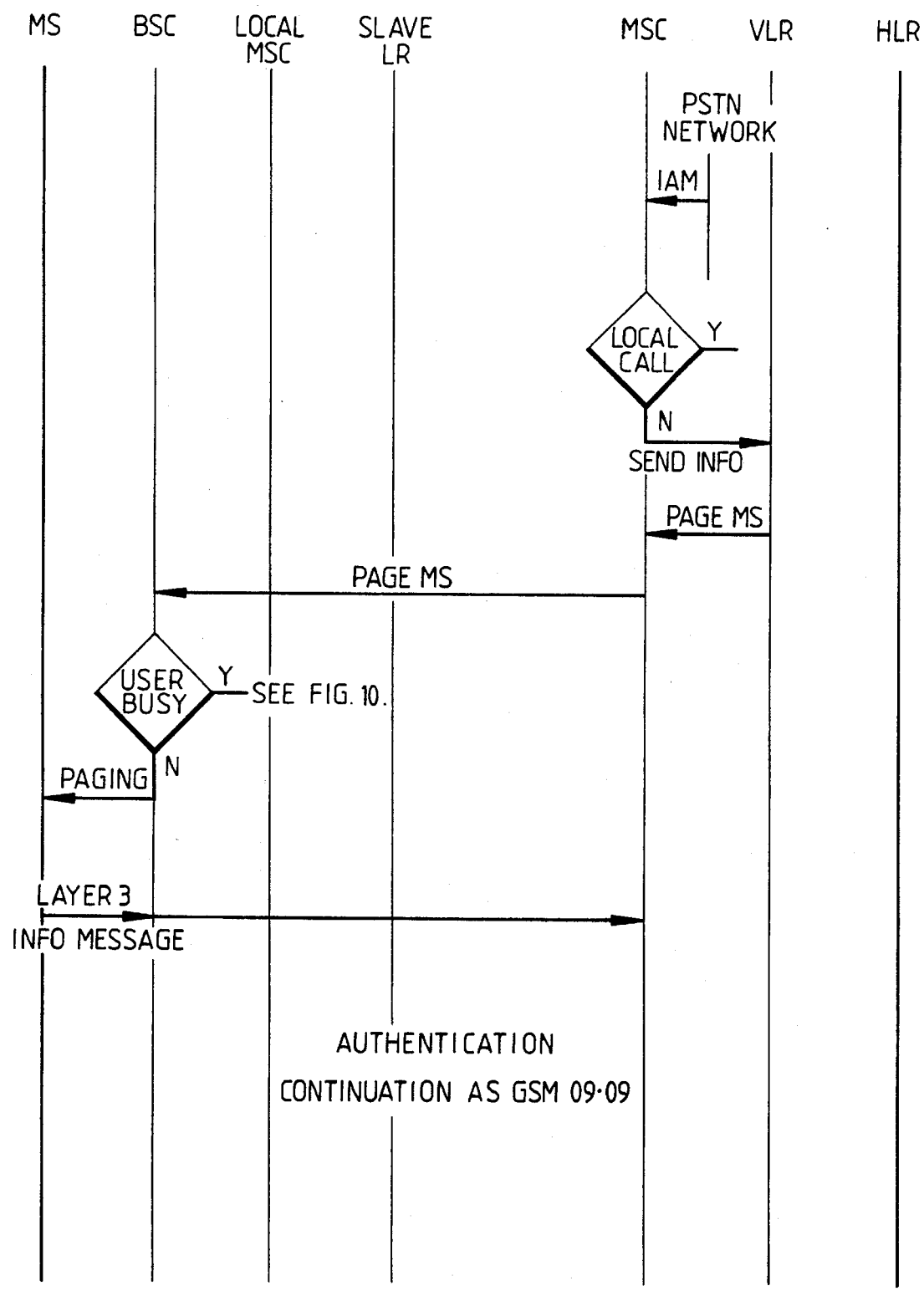
Figure 6:
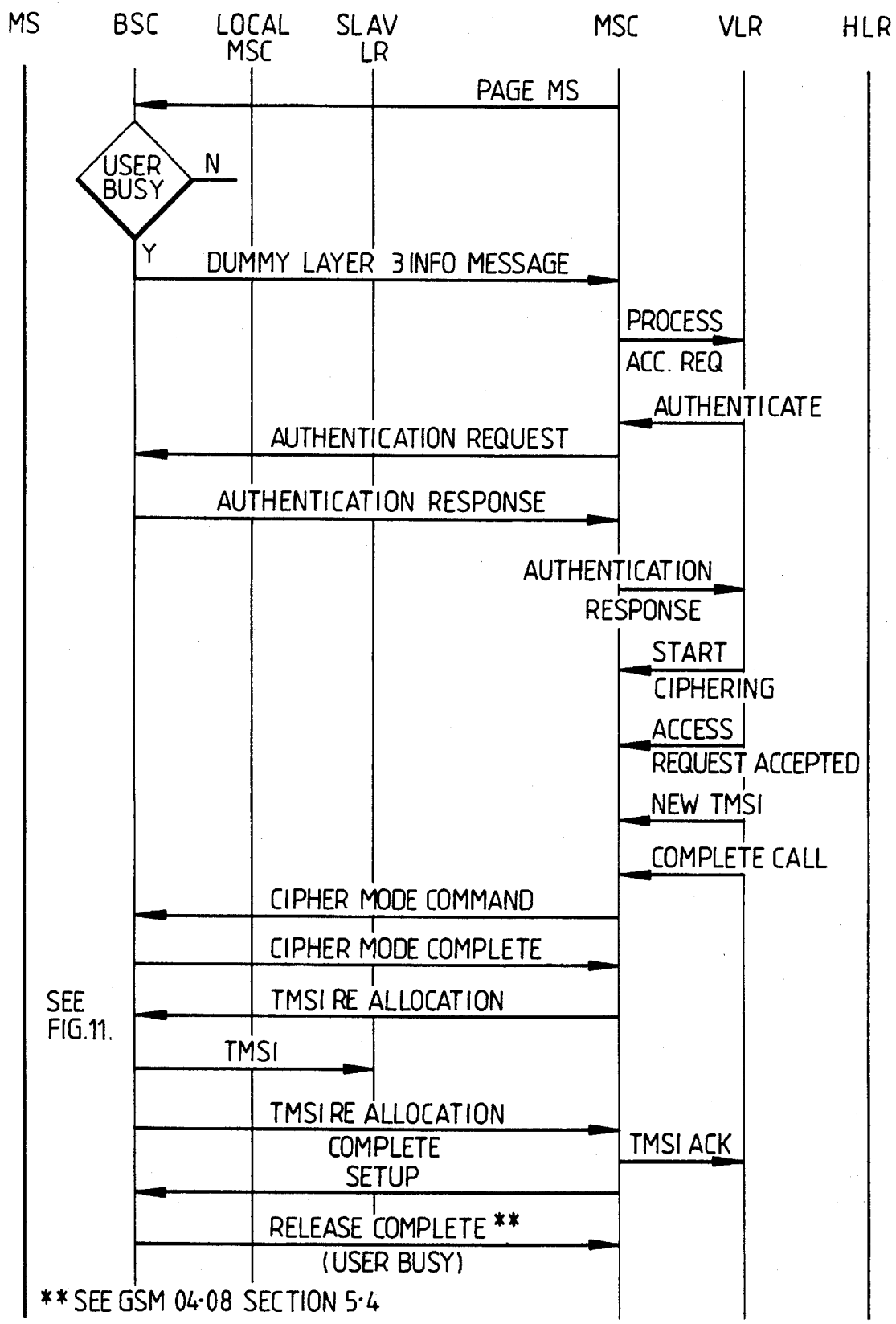

FIG. 5 illustrates a successful PSTN to PCN non-local call. The PSTN is indicated as between the MSC and its VLR since it is non-local to the BSC whereas PSTN network 1 in FIG. 4 was indicated between the local MSC and the slave LR since it was local to the BSC. The GSM 09.09 procedures are followed in this case but there is a possible condition which does not normally occur within GSM, i.e. that the called MS is busy without the MSC being aware of it, due to local call having been set up by the intelligent BSC. To cater for this the procedure is as follows. The PSTN network sends a IAM(initial address message) to the MSC which then asks the question, "is this a local call?" If it is not a local call the MSC sends a "send information for I/C call up" message to its VLR to request the parameters of the called subscriber. The VLR then sends a page MS message to the MSC to start the paging procedure, and the MSC sends a paging message to the BSC to initiate paging of the MS, but which BSC must first answer the question "is the user (MS) busy?" since the MSC may not be aware of this condition. If "yes" the procedure illustrated in FIG. 6 is followed. If the user is not busy the BSC initiates paging and when the addressed MS has responded a complete layer 3 information message is sent to the MSC. Authentication and continuation is as GSM 09.09.

FIG. 6 illustrates the non-local call (mobile subscriber busy) procedure. The user busy "yes" answer causes the BSC to send a dummy layer 3 information message to the MSC, which as a result sends a PROCESS ACCESS REQUEST to the VLR. The procedure is then similar to that described with reference to FIG. 3, ending with a release complete message (user busy) from the BSC to the MSC in accordance with GSM 04.08 Section 5.4.

Figure 7:
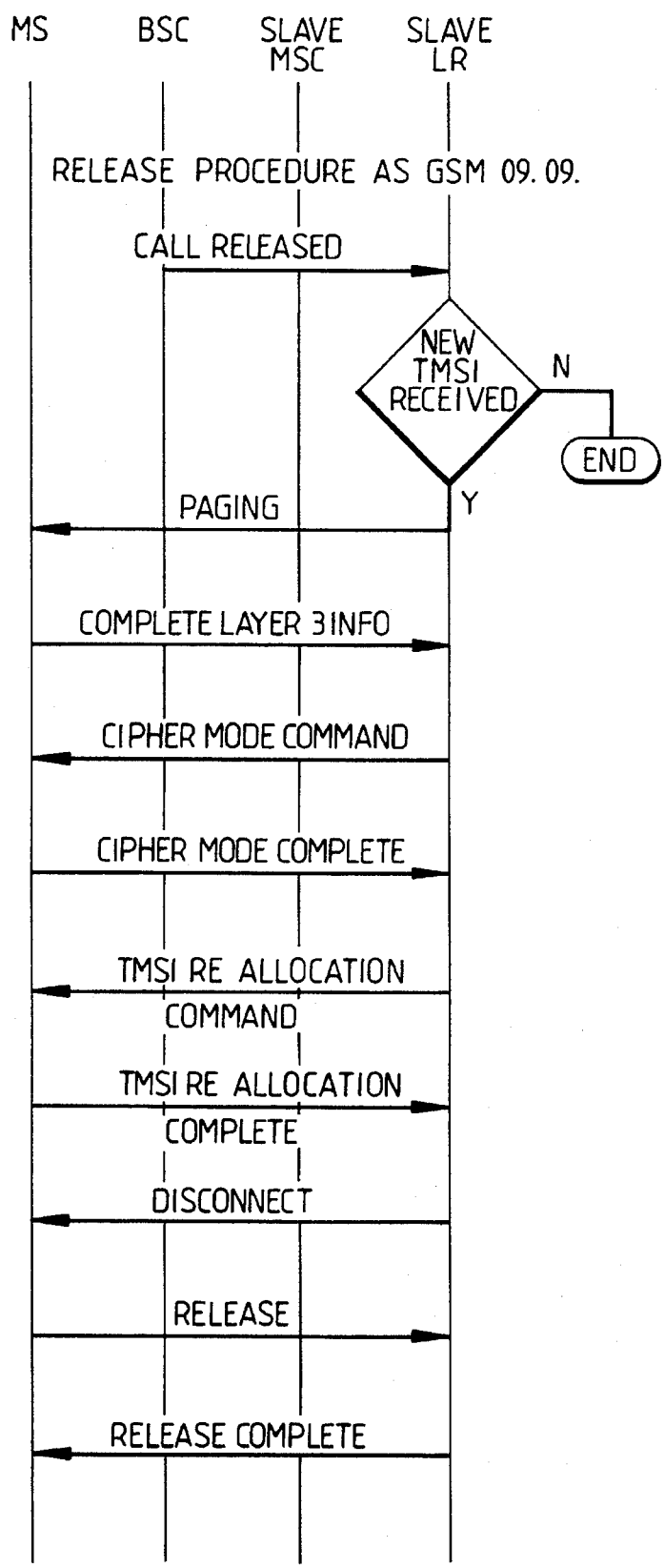

FIG. 7 illustrates the procedure at the end of a call in order to deal with the possible reception of a new TMSI during the call set up. When the BSC sends a call released message to the slave LR, the latter queries whether a new TMSI has been received. If "not" the procedure ends. If "yes", the mobile is paged and it responds with a "complete layer 3 info" message. A cipher mode command message is sent to the MS and a cipher mode complete message returned to indicated that the appropriate action on enciphering and deciphering has been started by the MS and the BSS. The TMSI reallocation command message transfers the value of the new TMSI in ciphered mode and the complete message confirms reallocation in the MS. The slave LR then sends a disconnect message to the MS which replies with a release message upon which the call is released and this is confirmed by a release complete message. This is effectively a new call which delivers the new TMSI but does not reach the speech phase.

Figure 8:
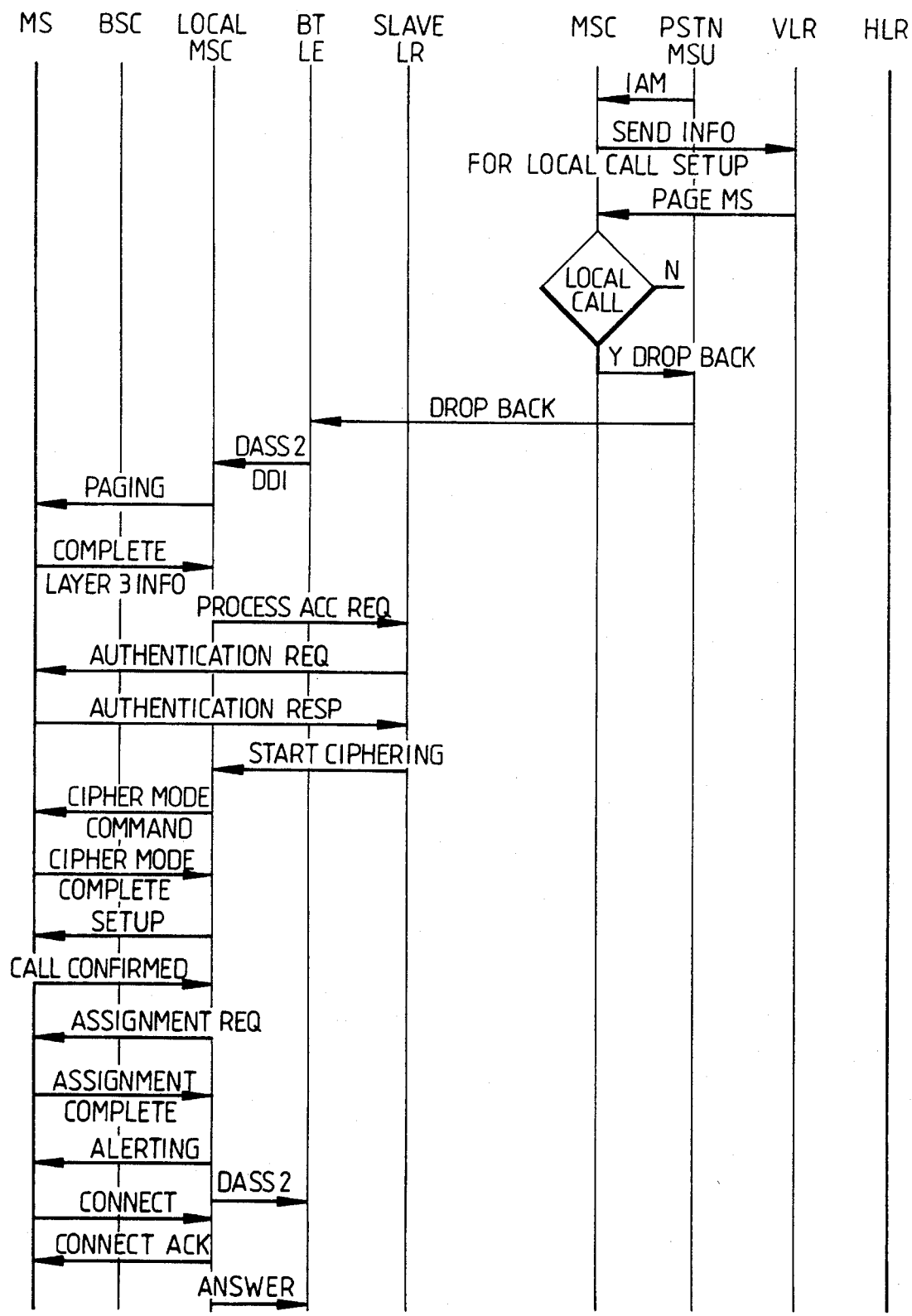

FIG. 8 illustrates a successful PSTN to PCN local call. As in the FIG. 5 procedure the IAM message is sent from the PSTN main switching unit (MSU) to the MSC, which then responds with a send information for local call set-up message to the VLR, and the VLR responds by sending a paging message "Page MS" to the MSC. The question "is the call local?" is asked and if the MSC answer is "yes" instructions are sent to the local PSTN (PSTN LE) via the MSU to take the necessary action. This is "drop back", which is a signalling mechanism defined within CCITT No 7 signalling. National User part. From the PSTN LE, DASS 2 signalling, for example, to the local MSC using a DDI code is employed. The local MSC initiates paging of the MS and the addressed MS responds to the paging by sending a complete layer 3 information message to the local MSC, which then sends a process access request to the slave LR. This is followed by authentication between the slave LR and the MS and a start ciphering message from the slave LR to the local MSC if authentication is successful. Then the local MSC and MS communicate for cipher mode command and complete, setup (for call establishment to the MS), call confirmation by the MS, assignment request and complete, alerting which is continued to the PSTN LE, connect and connect acknowledgement and answer which is sent to the PSTN LE. An example of how this local calling works within the context of an intelligent BSC will now be described with reference to FIG. 9.

Figure 9:
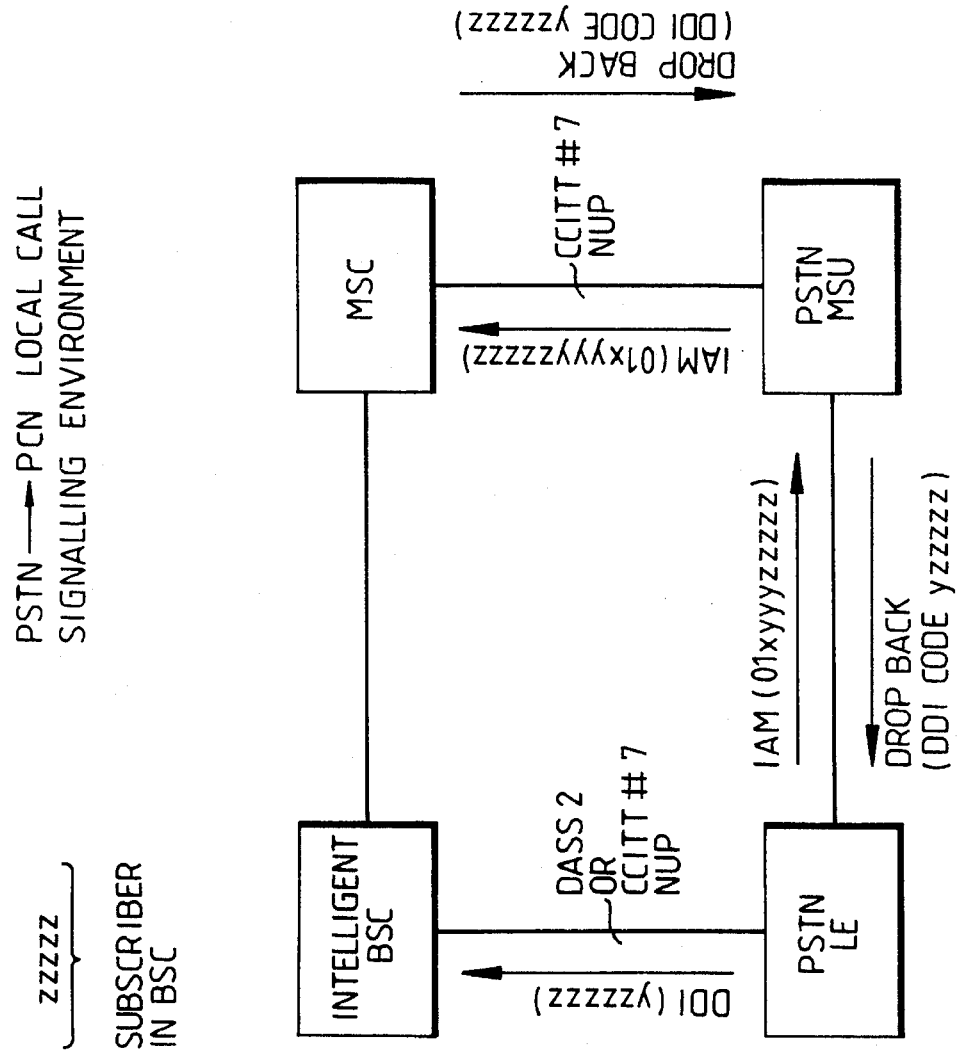
FIG. 9 illustrates an example of PSTN to PCN local call signalling.

For this example it is assumed that the PCN number is of the form shown in FIG. 9, but this is not the only possibility. The number has four basic components, a PCN designation, a PCN operator discriminator digit, a BSC discrimination code and a subscriber number within the BSC. Hence as illustrated a PCN number is in the form 01 X YYY ZZZZZ The choice of 01 for the PCN designation is only one possibility although that is particularly attractive now that it is no longer employed for the London numbers.

When the PSTN LE receives a call for 01 XYYYZZZZZ it translates OIX as being a PCN zonal tariff and gives the appropriate MSC junction. A number 7 Signalling messages IAM(OIX YYY ZZZZZ) is then sent to the MSC, via the MSU as illustrated. If the call is a zonal call there is no problem, but if it is not a zonal call (i.e it is a local call) then the MSC translates the message to give a DDI code comprising part of the PCN number (DDI Code YZZZZZ) and that is sent back (drop back) to the local exchange identifying a PCN local tariff and a BSC junction (the intelligent BSC in this example), which can be sent to the intelligent BSC as a DASS 2 message or a No 7 message, so that the call proceeds using the PCN local tariff.

Figure 10:
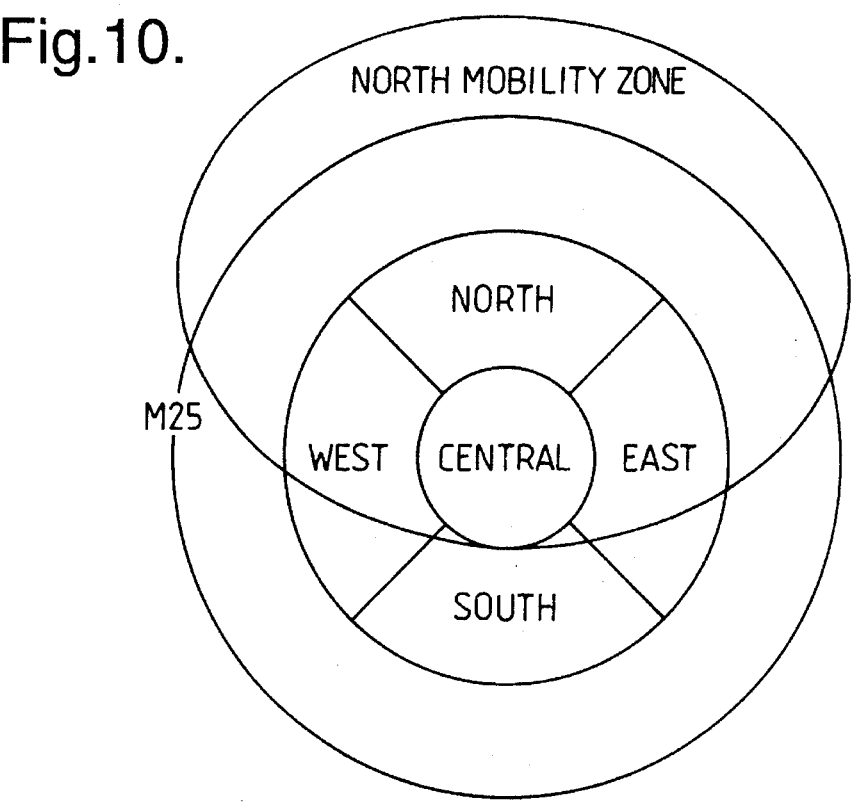
FIG. 10 illustrates a local access scheme for a large city.
Figure 11:
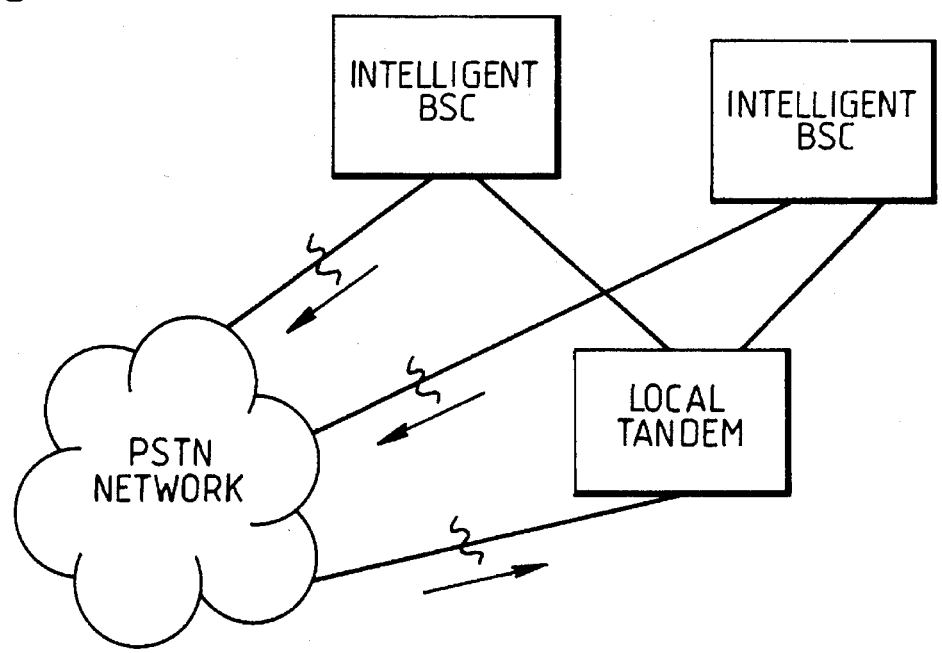
FIG. 11 illustrates local access for high capacity nodes.
Figure 12:
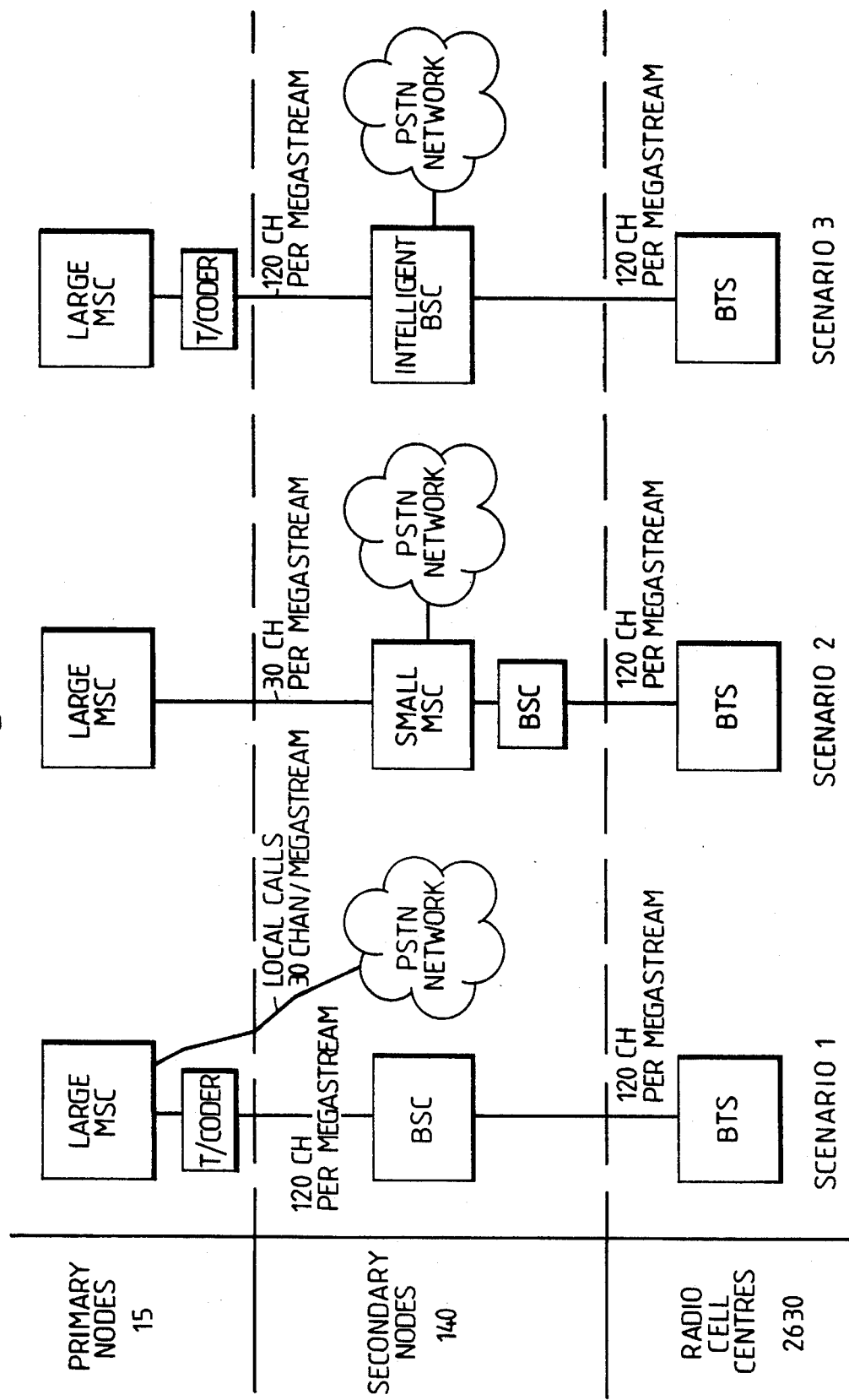
FIG. 12 illustrates three different local call scenarios.
Figure 15:
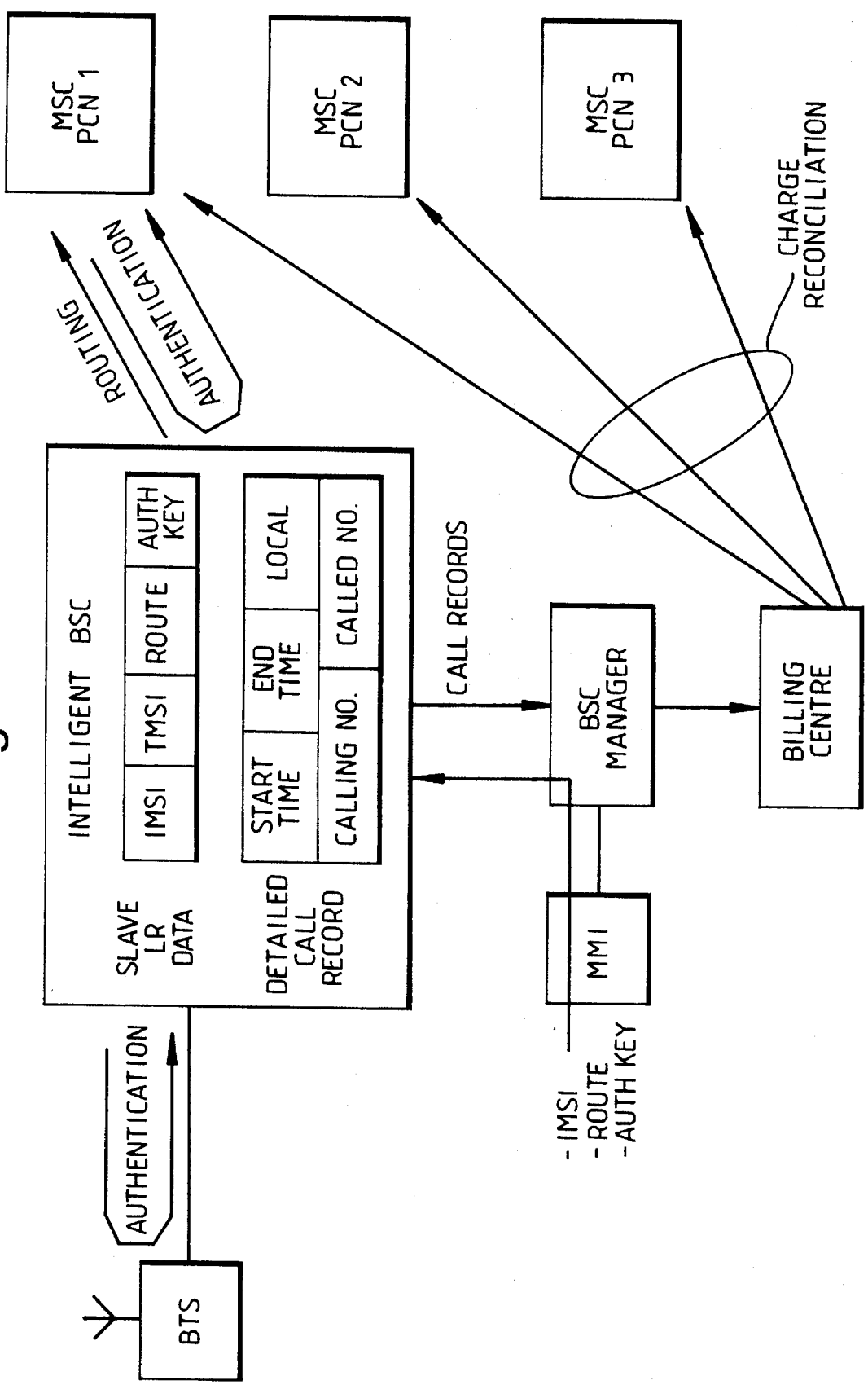

An example of how this could be applied to a large city, such as London, will now be described with reference to FIG. 10. It is assumed that within a city boundary, such as defined by the M25 motorway around London, the city is divided into five zones (central, north, south, east and west). A local tariff is applied when a MS is within an associated mobility zone. For example, FIG. 10 indicates a north mobility zone associated with a MS whose home zone is the north zone or whose base is on a north zone boundary e.g.

north/east zone boundary. Each BSC has associated with it a number of BTsc in order to cover respective areas of each zone. Handoff (handover) is determined within a BSC. Cheap local calls are terminated on leaving a mobility zone. This cheap local calling is a special service and there may be two classes of subscribers. "personal" class where cheap local calls are assumed but if full mobility is required, so that calls are not lost when a mobility zone is left, the called number can be prefixed by a hash (#). Alternatively, "feature" class where full mobility is assumed but a hash prefix is added when cheap local calls are required. A number of DDI codes are allocated per zone, for example 10. In London that would involve 150, Initially one DDI code per BSC will suffice, the capacity of a BSC being 20000 lines. With System growth available capacity could be quickly exceeded, in which case it would be necessary, for example, to identify a local tandem for return traffic as indicated in FIG. 11, in which case there would be one DDI code per tandem.

The local call tariffs apply for calls between MSs within a zone, MS to city fixed network and city fixed network to MS. If required MS to MS within the whole city could be implemented at the local call tariff from the MSC. If required a mobility zone could cover the whole of the city with grooming between a BTS and a BSC to share BTS channels over more than one BSC In FIGS. 12 and 13 there are illustrated three scenarios for achieving local calls. The numbers of primary nodes, secondary nodes and radio call centres quoted are examples only. Scenario 1 has standard BSC secondary nodes and calls to a PSTN network are via 30 channel per Megastream links connected directly to a large MSC, this is an example of the conventional arrangement of FIG. 1 which has the A bis an A interfaces over 120 channels per Megastream links. Alternatively (Scenario 2, at the secondary nodes is disposed an additional small MSC which is connected to the PSTN network. In this case the links between the secondary node and the large MSC are 30 channel per Megastream whereas the links to the BTS are 120 channel per megastream, thus the A and A bis interfaces are not maintained in this case and the transcoder must be moved to the secondary node. The arrangement proposed by the present invention (Scenario 3) and consisting of an intelligent BSC at the secondary node, which intelligent BSC is coupled to the PSTN network, allows the A and A bis interfaces to be preserved, the transcoder staying at the primary node, and thus enables certain conventional GSM equipment elements to be employed. The signalling has to be varied slightly as exemplified by the above to cater for the intelligent BSC. FIG. 13 illustrates estimates of the capital costs of the secondary nodes according to Scenarios 1 to 3 for three different stages of BSCs, the associated Megastream annual charges and amortisation over 10 years, these being the costs of ownership of the secondary nodes, then it is clear that Scenario 3 is beneficial in cost terms.

It is intended that there is more than one PCN operator but that mobiles subscribing to one operator can be connected via another operator i.e. an intelligent BSC will need to distinguish between different handsets. FIG. 14 illustrates a BSS infrastructure employing an intelligent BSC which is shared between three PCN operators (PCN 1, PCN 2, PCN 3, for example Unitel, Microtel and Mercury) i.e. the intelligent BSC is connected to respective MSCs for the three PCN operators. Such infrastructure sharing is particularly beneficial in low traffic areas. The operation of such a shared BSS infrastructure is illustrated schematically in FIG. 15. The authentication procedure will in this case also involve deciding which operator is concerned and routing the messages appropriately, and the billing procedure will also involve appropriate charge reconciliation. The intelligent BSC can also be such as to act as a standards conversion function between different radio standards (illustrated in FIG. 16 as three different types of BTS (PCN, CT2 and, DECT) and in addition support discrimination between two separate switching networks, the illustrated example has an MSC for a general PCN network and one for a mobile Centrex network.

This approach has been extended and varied by the interconnect strategy described below with reference to FIGS. 17 to 20. It is a particular feature of the intelligent BSC that it preserves the A and A bis interfaces of the GSM based PCN network between which it is disposed whilst providing this local call handling facility.

PCN networks require;
  local connections at local call rates; a reciprocal strategy whereby Public Telephone Operators (PTOS) and the PCN operators equitably benefit from the growth of PCN: an interconnection mechanism that will operate with the PSTN as it actually exists, Taking the first two requirements; then a basic eguitable interconnect structure would be as illustrated in FIG. 17. Trunk calls originating in the PCN network (BTS, BSC, MSC) are carried by the PCN up to the nearest MSC interface with the PSTN network TE (LE (local exchange) TE (trunk exchange)), and vice versa although there may be local traffic paths between BSCs and LEs as indicated for low cost calls. PCN networks require;
  local Connections at local call rates; a reciprocal strategy whereby Public Telephone Operators (PTOS) and the PCN operators equitably benefit from the growth Of PCN; an interconnection mechanism that will operate with the PSTN as it actually exists.

Figure 1:
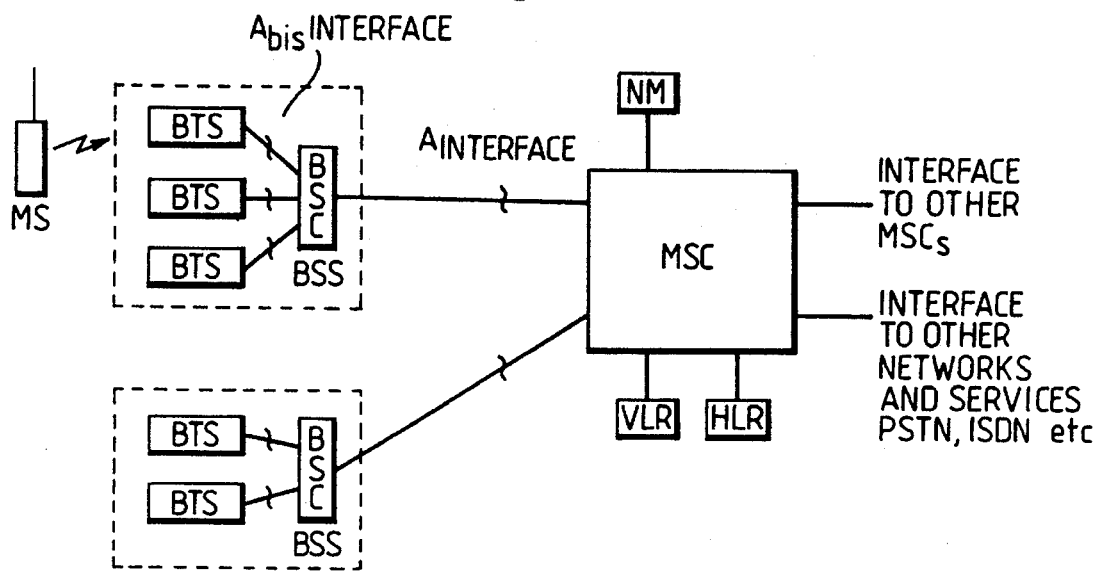
FIG. 1 illustrates a basic GSM network.
Figure 16:
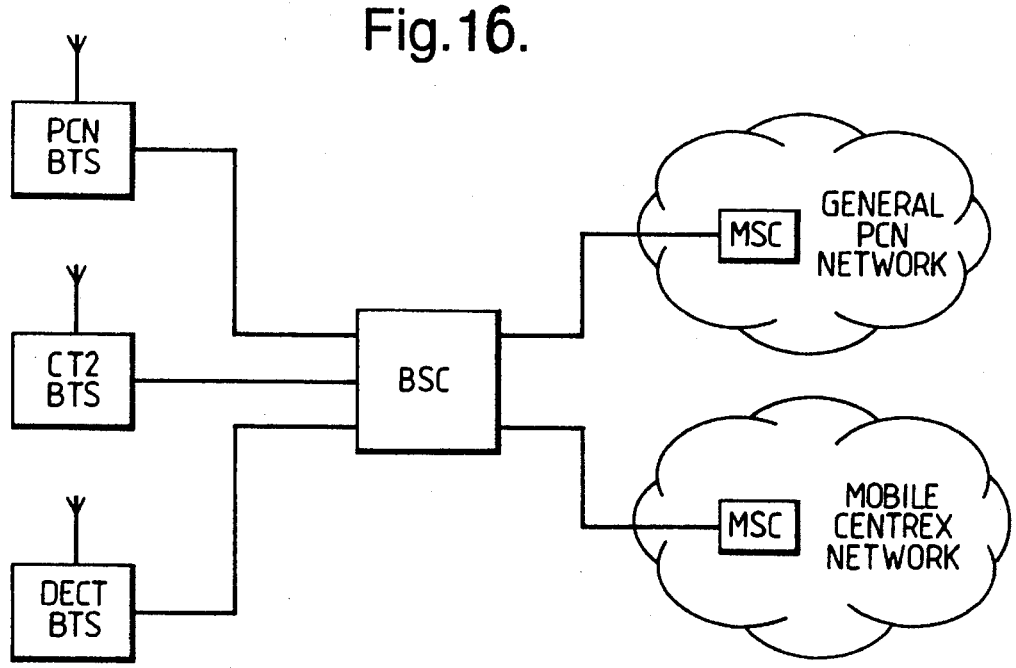
FIG. 16 illustrates a possible application of an intelligent BSC.
Figure 18:
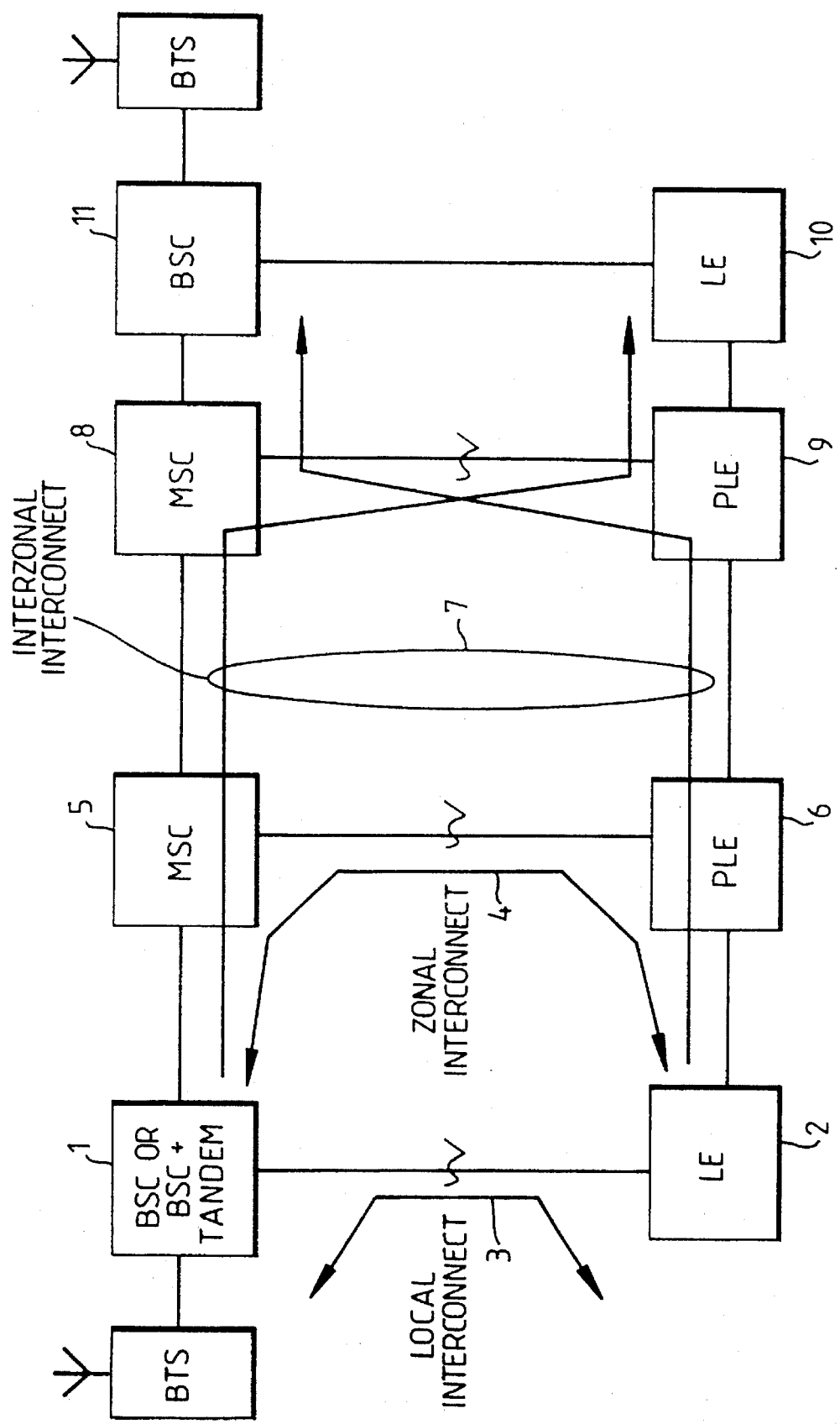
FIG. 18 illustrates another equitable interconnect strategy.

Taking the first two requirements; then a basic eguitable interconnect structure would be as illustrated in FIG. 1. Trunk calls originating in the PCN network (BTS, BSC, MSC) are carried by the PCN up to the nearest MSC interface with the PSTN network TE (LE (local exchange) TE (trunk exchange)), and vice versa although there may be local traffic paths between BSCs and LEs as indicated for low cost calls The interconnect strategy illustrated in FIG. 18 is practical at this time and is termed a PCN flexible interconnect. Local traffic in both directions between the PCN BSCI, and a local PSTN exchange (LE) 2 is routed directly over what is termed a "local interconnect" 3 when the BSC 1 is comprised by an intelligent BSC as described in said co-pending application, or such an intelligent BSC together with a local tandem for an increased capacity system as also described in said co-pending application. There is also a so-called "zonal interconnect" 4 between MSC 5 and principal local exchange PLE 6 for calls in both directions between the PCN (BTS. BSC, MSC) and the PSTN (LE, PLE), and an "interzonal interconnect" 7 for calls involving a remote MSC 8 or a remote PLE 9. This enables three different tariffs to be employed i.e. a PCN local tariff associated with a BSC junction, a PCN zonal network tariff associated with an MSC junction (local) and a PCN interzonal tariff associated with a remote MSC junction.

An example of a numbering and translation scheme which permits the different tariffs to be employed as appropriate will now be described with reference to FIG. 19.

It is assumed that the PCN number is in the form shown in FIG. 3 but this is not the only possibility The number has four basic components, a PCN designation, a PCN operator discriminator digit, a BSC discrimination code and a subscriber number within the BSC. Hence as illustrated a PCN number is in the form 01 XYYYY ZZZZ The choice of 01 for the PCN designation is only one possibility although it is particularly attractive now that it is no longer employed for the London numbers.

In addition to the PCN number there is a PCN routing code, shown in FIG. 19, for routing through this fixed network. This includes a national number group code allocated to the PCN (1 nn) added to the PCN designation (01), two digits of the BSC discrimination code (YY) and the subscriber number within the BSC. The PCN routing code is thus in the form 011 nn YYZZZZ When the PSTN LE 20 receives a call for mobile subscriber OIX YYYY ZZZZ from a PSTN subscriber it initially translates OIX as being a PCN zonal call with a zonal network tariff and identifies an MSC junction. A number 7 signalling message is (IAM OIX YYYY ZZZZ) is then Sent to the nearest MSC 21 via the PSTN main switching unit (MSU) 22. The MSC 21 determines from the location registers whether the called mobile is local, zonal or interzonal. If the call is a zonal call MSC 21 will be that identified and the call proceeds using the zonal tariff i.e. is terminated. However if the call is a local call, then the MSC 21 translates the message to give a DDI code comprising part of the PCN number (DDI Code YYZZZZ), identifying a PCN local tariff and a respective BSC junction (23), and that is sent back (drop back) to the local exchange LE 20, which routes it as a CCITT Q931 or national variant e.g. DASS 2, or a CCITT NO 7 NUP, message to the identified BSC 23 and the call proceeds using the PCN local tariff. Alternatively, if the call is an interzonal call then the MSC 21 translates the message to give a national number group PCN routing code, 011 nnYYZZZZ with a PCN interzonal tariff and a remote MSC junction (24) and this is dropped back to the LE 20 and thence sent to the identified remote MSC 24 via MSU 22 and remote MSU 25 as a IAM (OIInnYYZZZZ) message and thence to the appropriate mobile.

Figure 20:
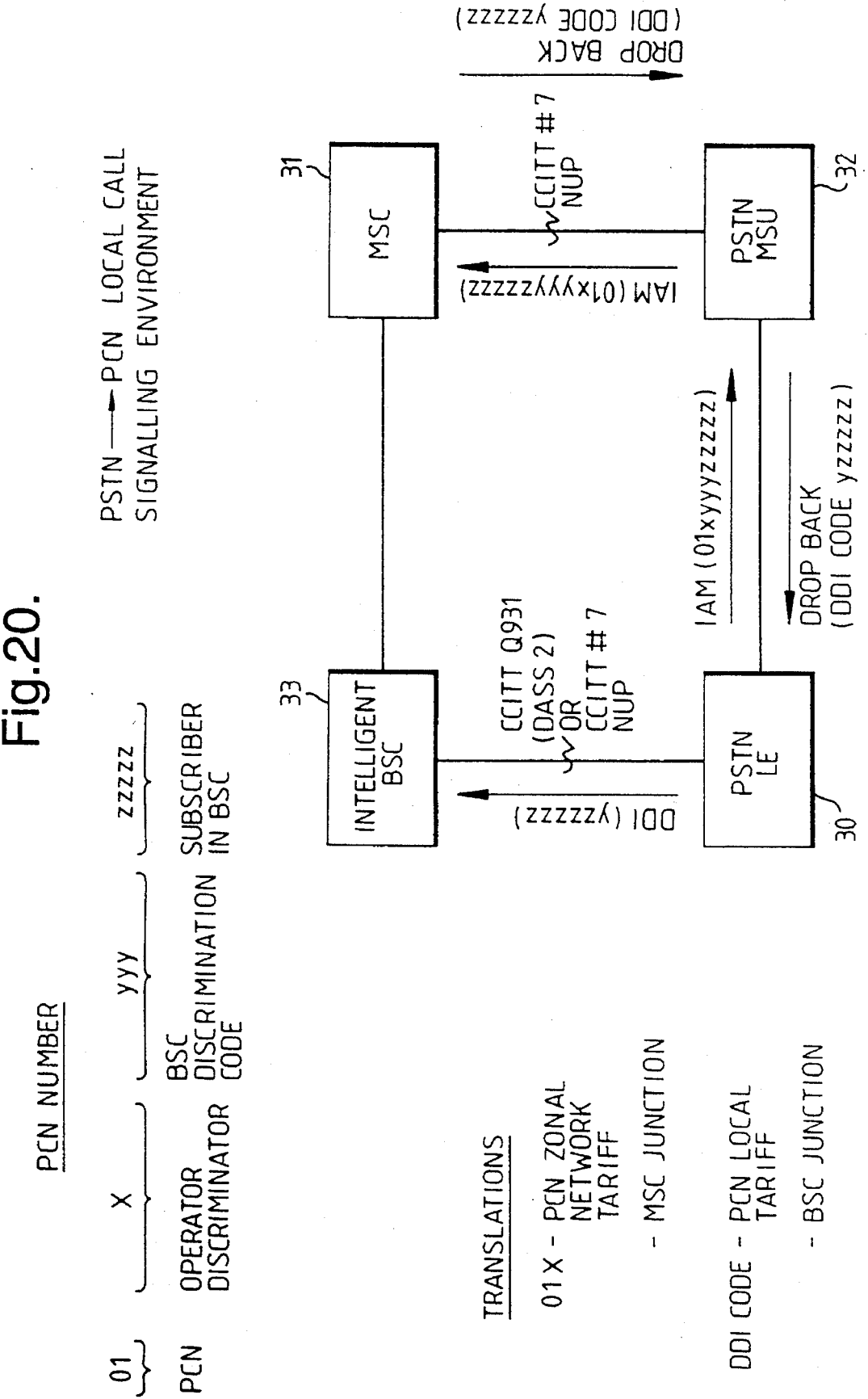
FIG. 20 illustrates another PSTN to PCN call signalling environment.

FIG. 20 illustrates another possible numbering scheme with translations which enables the tariffs to be employed (local and zonal), as opposed to the three tariffs of FIG. 19 (local, zonal and interzonal). In this example the PCN number is in the form 01 X YYY ZZZZZ but this is not the only possibility. The PCN number is comprised, as before, of a PCN designation, an operator discriminator, a BSC discrimination code and a subscriber number within the BSC.

When the PSTN LE 30 receives a call for mobile OIX-YYYZZZZZ it translates OIX as being a PCN zonal tariff and gives the nearest MSC junction, MSC 31 in this example. A number 7 signalling message (IAM(OIX-YYYZZZZZ)) is then sent to MSC 31 via PSTN MSU 32 as illustrated. If the call is a zonal call, as determined by the NSC from the location register, the call will proceed using the zonal tariff i.e. the call terminated. If the call is not a zonal call, i.e. it is a local call, then the MSC 3i translates the message to give a DDI code comprising part of the message (PCN number) as DDI code YZZZZ identifying a PCN tariff and a BSC junction (33 in the example) and that is sent back (drop back) to PSTN LE 30, via MSJ 32. The PSTN LE 30 routes the message e.g. as a DASS 2 or No 7 signalling message to BSC 33 and the call proceeds using the local tariff.

The interconnect structure of FIG. 18 is such that for all local calls between the PCN (BSC 1) and the PSTN (LE 2), for example, signalling is e.g. DASS 2 or CCITT No 7 (in either direction) and at a local tariff. For PCN to PSTN local calls this is as a result of the intelligent BSC noting that they are local calls and the local MSC function thereof routing them directly to LE 2. For PSTN to PCN local calls this is as a result of the MSC 5 noting that they are local calls and the subsequent drop back.

All zonal calls between the PSTN and the PCN, in either direction, are via the MSC 5 in the conventional manner and involves the zonal tariff.

All interzonal calls between the PSTN and the PCN, in either direction, are via the appropriate MSC, after drop back if necessary, and at the interzonal tariff. A PCN to PSTN interzonal call, e.g. BSCI to LE 10, is via the nearest MSC to (8) to LE 10 and the relevant PLE (9) in the usual way A PSTN to PCN interzonal call e g. LE 2 to BSC 11, is via the nearest MSC 5 to LE 2, to determine the actual MSC required from the location registers, with drop back and translation to the appropriate PCN routing code to reach MSC 8 and thence BSC 11 via the PLE 6 and PLE 9.

The schemes of both FIGS. 19 and 20 assume that the BSC is intelligent. However, a multiple tariff arrangement (zonal/interzonal) can also be envisaged if the BSC has a standard GSM structure i.e. is not intelligent. In this case the local interconnect (cheap local calls) is not provided. Zonal calls will be processed via the MSC 21 and MSU 22 in the conventional manner and use the zonal tariff but interzonal calls (PSTN to PCN) will be identified at the MSC 21 as described above with resultant drop back and retranslation to the PCN routing code and use of the interzonal tariff.

The interconnect structure proposed in FIG. 18 is both flexible and equitable and allows application of multiple tariffs (local and zonal, or local, zonal and interzonal, or zonal and interzonal in the above examples) depending on the actual location of the mobile subscriber. By equitable it is to be understood that the structure supports calls set up in either direction PCN to PSTN or PSTN to PCN, with the same tariffs being applied in both direction. The PSTN does not need to know where the mobile is, rather this is determined from or via the 'nearest' MSC and to which the IAM message is first directed, i.e. a gateway having access to the GSM location registers, anti sent back to the PSTN as a drop back message (as defined in BTNR 167 Issue 3, July 1987, SS No 7 NUP). Thus the whole of the PSTN fixed network does not have to be given access to the location registers of the PCN and major changes to the fixed network to acquire the location knowledge are not required. The gateway to the PCN (MSC 21 or 31 in the above examples) accepts zonal calls and translates digits received into a DDI code if the call is local, i.e. the mobile is local, or into a PCN national number code if the call is interzonal. The information message received at (dropped back to) the local exchange is used to restart translation giving a new tariff and a new destination. The fixed network does not require massive change, rather a simple information message is implemented in order to determine mobile location information. Overall, therefore, the PCN is allowed to have different tariffs e.g. for local, zonal or interzonal calls, rather than the present cellular systems which have one tariff for all interconnect purposes. Basically this is achieved by translating a PCN number called by a PSTN subscriber into DDI code for local calls and national network code for distant ones, the basic PCN number resulting in a zonal call and the zonal tariff.

Figure 21:
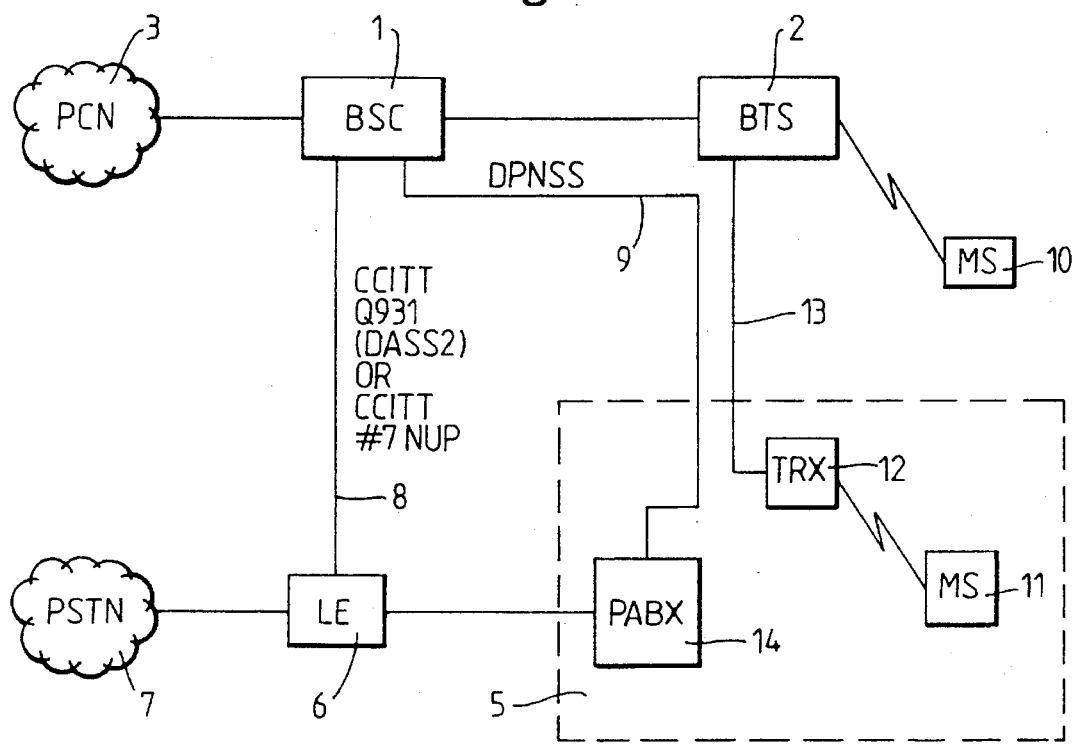
FIG. 21 illustrates the basic concept of a PCN cordless PABX arrangement of the present invention.

The present invention also employs the intelligent BSC but in this case links it to a PABX disposed, for example on a corporate site. FIG. 21 illustrates a basic PCN cordless PABX concept. The intelligent BSC 1 is coupled to a PCN BTS 2 in the usual manner and also to other PCN elements which are indicated only schematically at 3. A PABX 4 on a corporate site 5 is coupled to a PSTN local exchange LE 6 and also to other PSTN elements which are indicated only schematically at 7. A link 8 for local calls between the intelligent BSC 1 and the local exchange 6 employing CCITT Q931 or national variant DASS 2 or CCITT No 7 NUP signalling as in GB Application No 9013598.9 (R H Mauger 2) is indicated. There is a DPNSS (Digital Private Network Signalling System No 1) link 9 between the intelligent BSCI and the PABX 4. The BTS is able to communicate with mobile subscribers 10 within its range in the usual manner but, as illustrated, is also able to communicate with mobile subscriber 11 within the corporate site 5 by means of a transceiver TRX 12 coupled thereto by link 13 and disposed within corporate site 5. The separate transceiver TRX 12 may not be required if the corporate site is sufficiently covered by the BTS itself.

By means of the arrangement shown in FIG. 21 it is provided that a subscriber to the PABX at the corporate site and wanting to contact a PABX mobile subscriber 11 simply dials a normal 3 or 4 digit extension number assigned to the mobile. The PABX will recognise this as a mobile subscriber number and route the information to BSC 1 over link 9. Then through the normal PCN process a call will be established to the mobile if he can be found via, as illustrated BTS 2 and TRX 12 for on-site calls. If the mobile cannot be found on site, processing can continue using normal PCN techniques to actually find it elsewhere or alternatively it might be the case that the mobile is off-site and it is not necessary to look elsewhere. There are clearly many possible options if the mobile is off site, only two of which are mentioned here.

The PABX can have the equivalent of a DDI identity so that if a mobile calls in from the PCN it can call a particular PABX.

Figure 22:
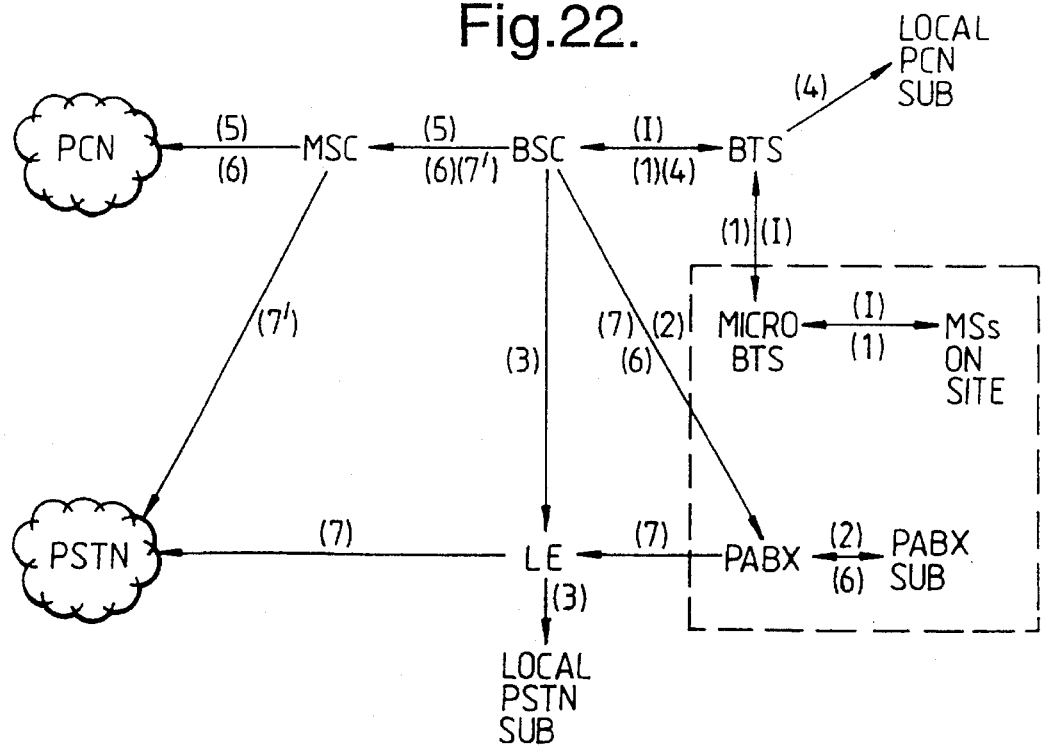
FIG. 22 illustrates call set-up routes for a number of different cases.

FIG. 22 illustrates the same basic arrangement as FIG. 21 but in a more schematic form and basically shows the routes by which calls are set-up from a mobile on-site subscriber. The transceiver TRX 12 is here shown as a MICRO BTS which is what it effectively is, and an MSC of the PCN and a link from it to the PSTN 7 is also shown.

Whenever the on-site mobile subscriber goes the equivalent of off-hook, then this information is automatically routed via the Micro BTS and the BTS to the intelligent BSC. This is indicated by (1) on the various links involved. There are a number of options, for example:

(a) for calls between mobiles on site, the routing will be to the BSC and back again (route (1)), with (I) indicating an incoming call from the BSC;

(b) for a call between a mobile on site and a PABX subscriber (PABX Sub), routing (1) to the BSC as before and the BSC recognises this call as to a PABX subscriber and routes it over route (2) to the PABX and thence to the PABX subscriber;

(c) for a call between a mobile on site and a local PSTN subscriber (sub), routing (1) to the intelligent BSC as before and thence directly to the local exchange LE and the local PSTN subscriber over route (3).

(d) for a call between a mobile on site and a local PCN subscriber (sub), routing (1) to the BSC as before then back to the BTS and to the local PCN subscriber over route (4);

(e) for a call between a mobile on site and a distant PCN subscriber, routing (I) to the BSC as before then to the PCN in general via the MSC over route (5);

(f) for a call between a PABX subscriber (on site) and a distant PCN subscriber the routing will be to the PABX to the BSC and thence to the PCN in general via the MSC i.e. route (6);

(g) for a call from a mobile on site to a trunk PSTN the routing is first to the BSC as usual over route (1) and then either to the PABX, the LE and the PSTN over route (7) or to the MSC and then to the PSTN over route (7').

Routing of incoming calls to a mobile on site will be similar. In this case the incoming call must first be routed to the BSC and thence to the MS on site, (I) indicating the BSC to MS incoming calls as before. The various options include PABX sub to MS on site; PSTN (local or otherwise) subscriber to MS on site; local PCN sub to MS on site; and distant PCN subscriber to MS on site. There is also the case of a distant PCN subscriber to a PABX sub and this will also be via the BSC.

Figure 23:
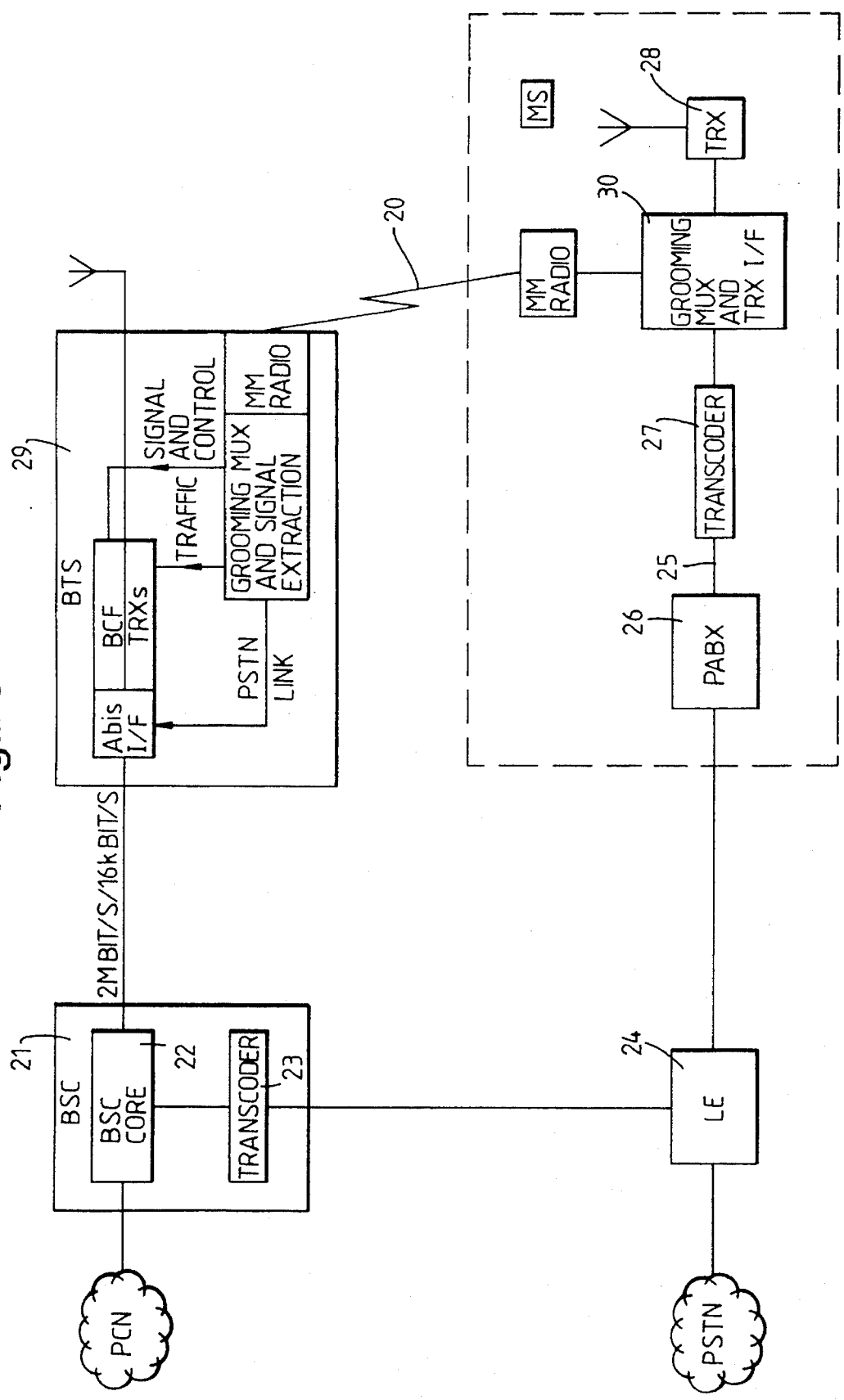
FIG. 23 illustrates a specific example of a PCN cordless PABX arrangement in greater detail.

FIG. 23 shows an example of an implementation of the PCN cordless PABX of FIG. 21, which latter is particularly schematic. Links 9 and 13 of FIG. 1 are drawn close together over part of their lengths and are actually provided by a single link in FIG. 23, a microwave link 20 as drawn. The intelligent BSC 21 has a BSC core 22 and a transcoder 23 to get out to the local exchange LE 24. Otherwise 16 kbit/s working is envisaged as normal. The connection 25 from the PABX 26 is like that of the LE 24 at 64 kbit/s and thus a further transcoder 27 is required. Ignoring the transceiver TRX 28, the transcoded signal from the PABX 26 needs to be routed up to the BTS 29 and it is currently envisaged that this is via microwave link 20. The configuration capability of the BTS 29 is used to route the transcoded PABX signal, since the BTS is nearest, and it is used to take the traffic circuits on to the BSC 21 following splitting out from the other signals. If a transceiver 28 is actually disposed at the site, for example, in those cases where the BTS one is not sufficient i.e. the signal may not come into the building, it will be necessary to multiplex the TRX signals and the transcoded signal so that a single link 20 is employed and for this purpose block 30 is required, this providing grooming and multiplexing as well as a TRX interface. It may actually be necessary to provide a TRX 28 on each floor of a building. The arrangement illustrated avoids the need to put a complete BTS station at the corporate site and is thus substantially cheaper to implement. The BTS extracts the transcoded signal from the PABX and applies it to the rest of the PCN system as illustrated.

Figure 24:
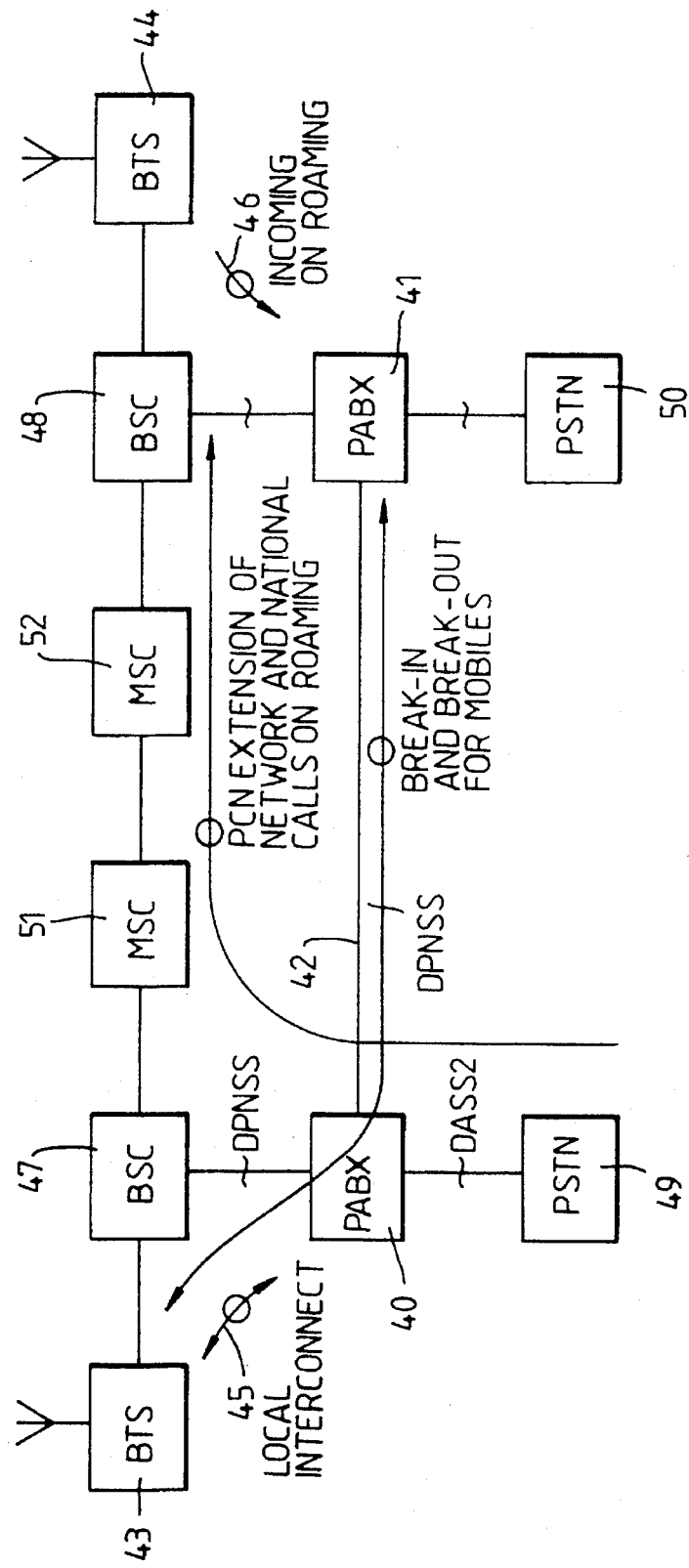
FIG. 24 illustrates an example of a PCN cordless PABX numbering scheme.

In order to achieve all of the various possibilities of interconnection with PABX subscribers, mobile or otherwise, a suitable numbering scheme must be chosen. An example of a PCN number with an associated corporate net number and a national number with DDI is indicated in FIG. 24. This drawing actually envisages a case not described previously but which is likely to be encountered in practice, i.e. where a business has several corporate sites and mobiles are required to be contactable irrespective of which site they are on at the time. There are, in the example shown in FIG. 24, two corporate sites PABX 40 and PABX 41 which are linked by a DPNSS line 42. Thus the functionality of the PABX FIG. 23 is now split between the sites. The two PABXs thus appear to be a single one. At both ends of the system there is a local interconnect 45, 46 to the respective BTSS 43, 44. The PABXS 40, 41 are connected to respective BSCs 47, 48 via respective DPNSS links and to the PSTNS network 49, 50 via DASS2 links. The PCN network additionally includes MSCs 51 and 52. It is intended that a PABX mobile subscriber which is normally associated with PABX 42, for example, can move to the site associated with PABX 41 and still be found for calls coming from the PABX or the BT network since if BSC 48 cannot find him, the normal PCN search process will be followed treating his as a normal PCN subscriber and BSC 47 will find him instead in this example. Similarly the PSTN will be able to reach the PABX mobile subscribers since they will have dialled a corporate PSTN number.

FIG. 24 illustrates an example of PCN numbering scheme for this application, i.e. a business user. It includes a PCN code (01), a PCN operator discriminator (X), a four digit BSC code (YYYY) the first digit of which may be O indicating a simple personal subscriber or 1–9 indicating a corporate subscriber, and the three subsequent digits defining a BSC (home base), and a four digit code (ZZZZ) the first digit of which, when taken with the first digit of the previous four digit code, defines a corporate account in the BSC and the last three digits of which defines a corporate subscriber in the BSC, the whole of these four digits taken together defines a personal subscriber in the BSC. The corporate net number comprises a three digit (AAA) code defining corporate locations and a four digit (BZZZ) code, the last three digits of which define the corporate subscriber in the BSC i.e. from the PCN number. The B can distinguish between different sites e.g. be 3 for the PABX 41 site or 5 for the PABX 40 site. The national number with DDI of a mobile corporate subscriber is O (NNG)BZZZ (NNG is the national numbering group code).

For such corporate mobile subscribers a roaming requirement is a possibility. Thus a call established while the mobile is on the site associated with PABX 41 can be continued via the PCN network as the mobile roams and if it subsequently arrives at another corporate site such as that associated with PABX 40 the call can still be continued although the mobile will effectively become a local caller again.

The corporate identity BZZZ whilst being general will actually associate with a particular PABX. Thus if 3076 is dialled at the site associated with PABX 41, the search for the MS will be local, but if 5076 is dialled at PABX 41 the search for the MS will be at the site associated with PABX 40. The PABXs can do that basic routing via link 42, and connected to the appropriate site, break out and search for the mobile can be carried out.

Figure 25:
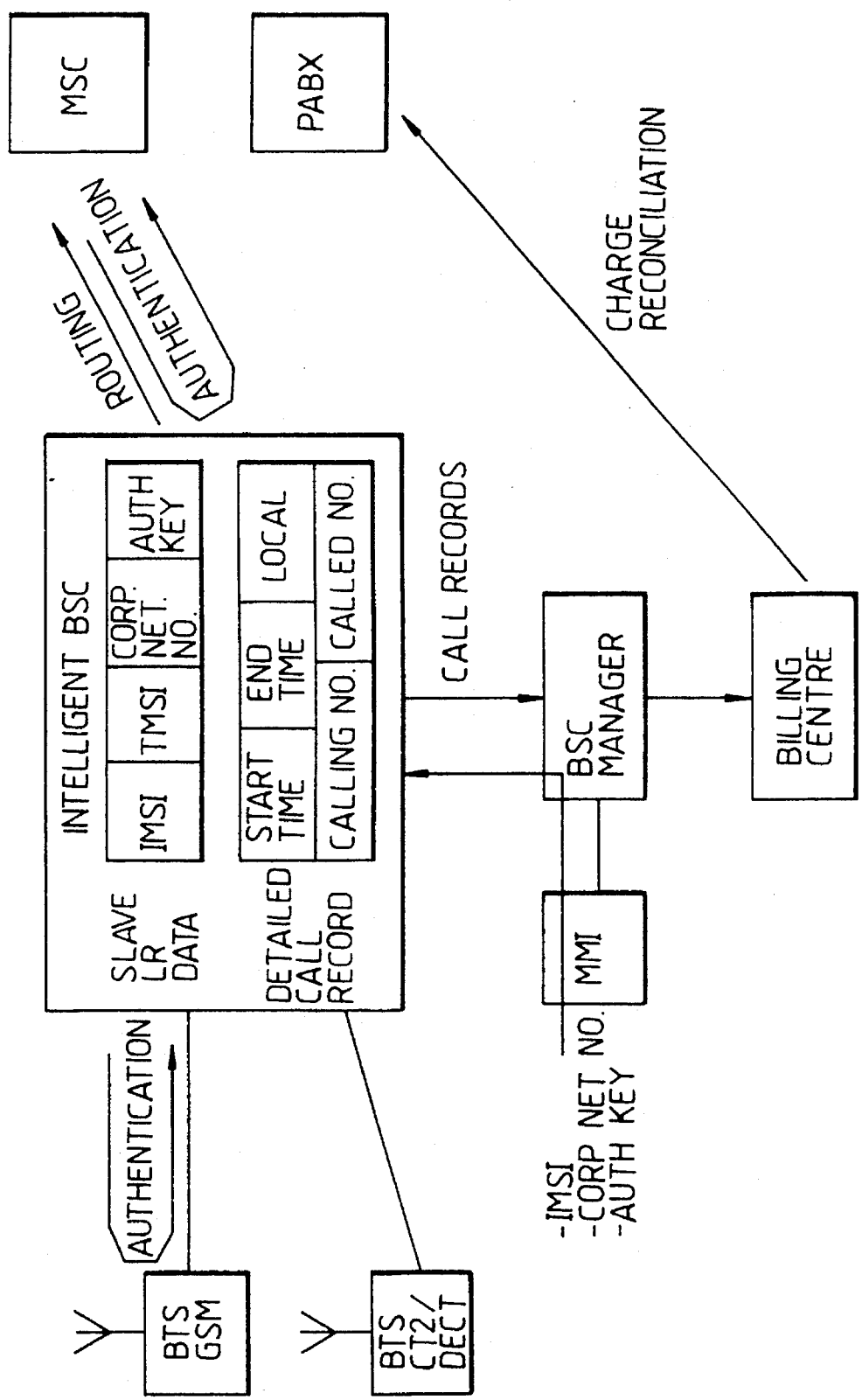
FIGS. 25–27 illustrate examples of PCN cordless PABX call management.

As referred to above, other radio standards e.g. CT2, DECT can also be accommodated, the intelligent BSC being used to provide the requisite standards conversion. FIG. 25 shows an arrangement similar to FIG. 15 in which a PABX can be billed as well, instead of different PCN operators of that FIG. 15.

Figure 26:
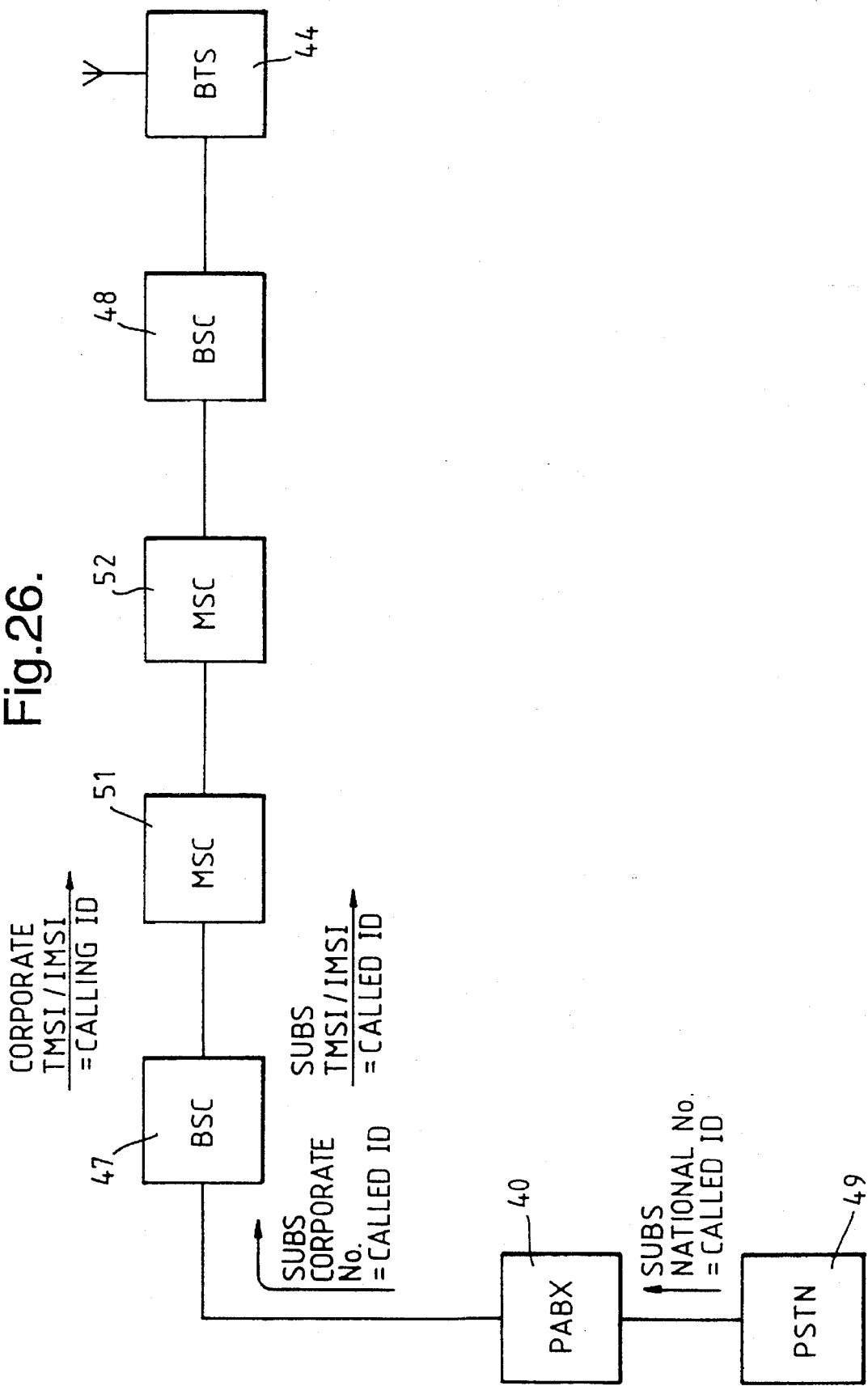

FIG. 26 illustrates an example of PCN cordless PABX call management, in particular, extension of calls over the PCN on roaming and uses the same reference numbers as FIG. 24. A subscriber to the PSTN network 49 calls a corporate mobile using the national number (DDI No, O(NNG-)BZZZ). The PABX strips the front part of the code off and sends BZZZ, the subscriber corporate number, and possibly an indication of who the call is from to the BSC 47 which translates it into the appropriate TMSI/IMSI for the PCN network to actually locate the called subscriber, the calling ID is also translated, and the call proceeds through MSCs 51 and 52, BSC 48 and BTS 44. At the far end, if the handset has a calling number identification display the PABX 40 will be identified but not who on it was calling.

In the arrangements so far described the linking of a corporate network involving a PABX with a PCN network has been considered. However further advantages flow from extensions of this, as will be described hereinafter, particularly in terms of call cost.

In order for mobile communications systems to be successful, the call cost must be affordable although the call costs associated with a corporate (business) community of interest may be different to those of a personal (residential) community of interest. For example, salesmen with traditional cellular car phones may roam over the whole of a large area, such as the United Kingdom, and their calling pattern may be different depending on where they are located at any time. In a PCN concept, many subscribers will be of the family type (residential rather than business) and a much smaller area of coverage will generally be involved. Certain small businesses, such as estate agents, for example, will also generally require relatively small coverage areas. When a call is made between a subscriber to a PSTN and a mobile which is local to that subscriber, the call costs are expected by the caller to be less than when the mobile is further away. As discussed above, in the basic GSM arrangement a call made by a mobile station to a fixed telephone connected to a PSTN has to be processed through the relevant BTS, BSC and MSC to the PSTN, even if the fixed telephone is actually local to the mobile station or rather the BSC. The charges incurred in making such calls will thus be high, since transmission to the MSC, which may be a considerable distance away from the BSC, will be over fixed lines which are expensive to provide or rent. Thus Application No 9013598.9 proposes the use of an intelligent BSC which is such as to recognise that a local call is involved and to route it appropriately.

Now, a business community of interest may be a UK business site, with its own PABX, of a world-wide corporation that already has a corporate network which allows very cost efficient calls to be made between sites worldwide. If the PCN network is coupled to such a corporate network the possibility arises of being able to use the corporate network with its associated "low cost" calls. Furthermore a residential community of interest can also be coupled in, so that a person employed by such a corporation and living in a particular residential community of interest can have a single mobile telephone and roam where he likes, the calls being billed according to his location, e.g. to the corporation when he is within the business jurisdiction and to his residence when he is in the residence jurisdiction.

Figure 27:
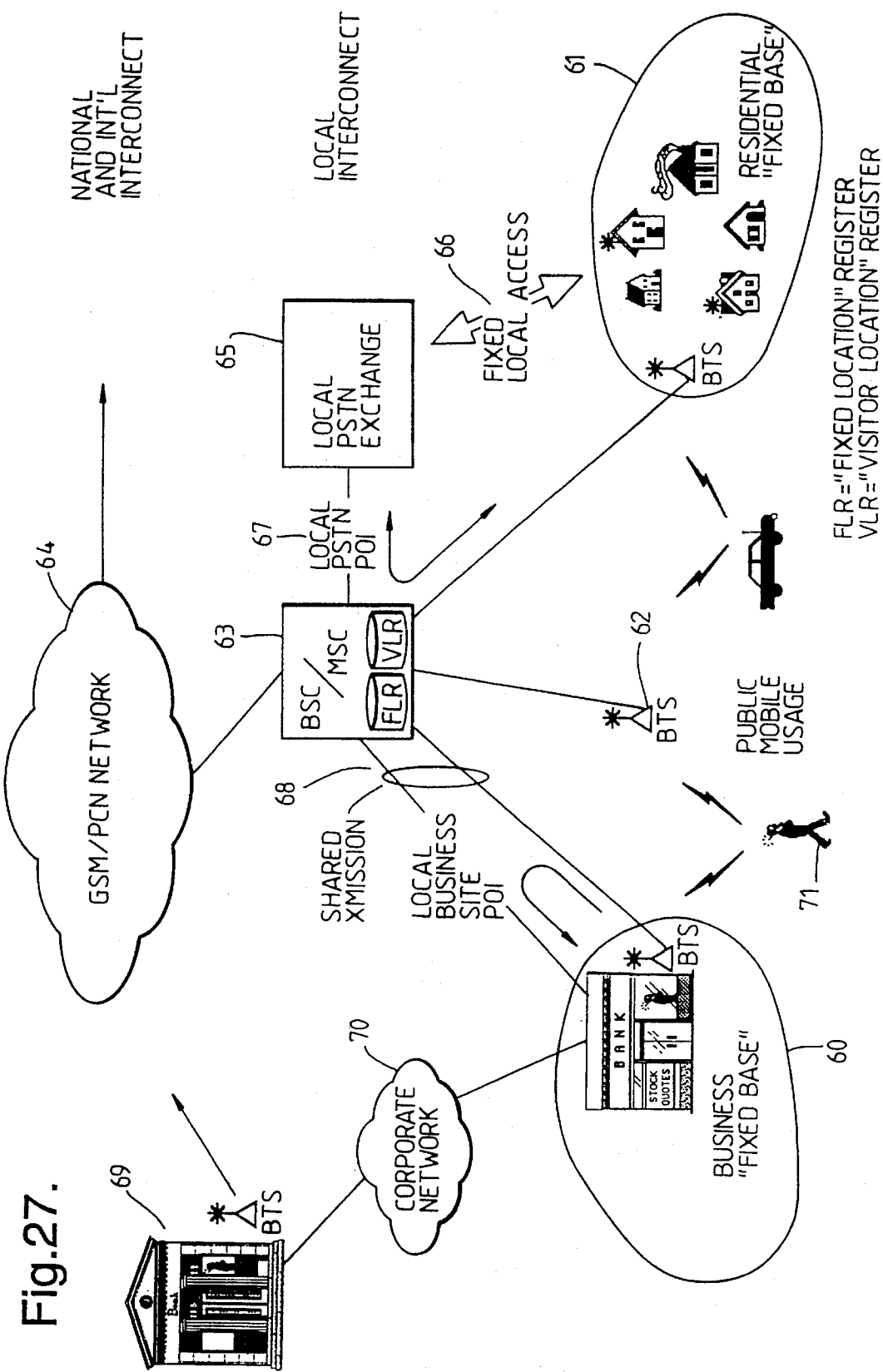

A system which enables these possibilities to be achieved is illustrated in FIG. 27. The PCN system includes a BTS at a business fixed base 60 having a PABX, a BTS at a residential fixed base 61, a BTS 62 between the bases 60 and 61 for public mobile usage, an intelligent BSC 63, based on that described above, and other elements indicated schematically as PCN network 64, via which national and international connections can be made, such as via BT. Connected to intelligent BSC 63 is a local exchange 65 for local interconnections to PSTN subscribers within the residential fixed base 61 over fixed local access 66. The connection 67 between intelligent BSC 63 and local exchange 65 is termed a local PSTN POI (point of interconnect). In addition to the interconnection between intelligent BSC 63 and the BTS at the business fixed base 60 there is a local business site POI as indicated, transmission actually being shared, as indicated, over a common interconnect 68. Another business base 69 having its own BTS connected to the PCN network 64 is connected to business base 60 via a corporate network 70, which may include business bases disposed on a world-wide basis and linked on a cost-effective basis. The mobile subscriber 71 can roam where he likes within the fixed business base 60, the fixed residential base 61 and anywhere else outside of them, particularly as drawn for example therebetween and within range of BTS 62. The mobile subscriber's location thus varies and it is necessary for this location to be associated with a new functionality of the intelligent BSC 63, namely that of a Fixed Location Register (FLR) rather than a Home Location Register (HLR) as in conventional GSM/PCN arrangements, as well as that of a VLR (Visitors Location Register). The intelligent BSC 63 needs to be able to recognise whether the subscriber is at business or home (residence) and provide the appropriate services. In the case of the residence, this will mostly relate to tariffing and billing of calls of made by the subscriber. For incoming calls to a mobile subscriber such as from a BT network, the BT network will not itself know where the mobile subscriber is, but the PCN network can find him using the location registers, generally checking the VLR's first. When the subscriber is within the business fixed base 60, it is not just a tariffing situation that pertains, although calls to fixed extensions or other mobiles within the building/site will be directed by the BSC 63 back to the PABX, as described with reference to FIGS. 21 to 23 for example, without involving outside agencies, such as BT, and thus with full control of the tariff.

As will be appreciated, the intelligent BSC is a BSC with some of the MSC's functionality disposed thereat rather than all being separated. Thus some of the MSC's functionality is located at a BSC in proximity to the interconnect points. In particular this functionality is a switching functionality such as may be provided by our DMS (Digital Multiplex System) switch, in particular a small version which can be considered to be a small MSC/intelligent BSC. The DMS switch has other functionality to switching functionality, in particular service functionality such as "least cost routing" capabilities which enables all calls to be analysed and made in the most cost effective manner. For example, assume there is an arrangement whereby the least cost routing to New York City is via the corporate network 70, then a call made by mobile subscriber 71 to New York City whilst he is within the business fixed base 61, will be recognised as such and re-routed by the intelligent BSC 63 back to the corporate network 70, rather than via the PCN network 64. Thus when the mobile subscriber 71 is within his business base his mobile telephone will behave in an identical way to a fixed one on his desk connected to the PABX. Least cost routing and tariffing are not the only services which can be provided, any services provided by a desk phone can be provided for the mobile phone whilst within the business fixed base.

Least cost routing can also be applied to calls made whilst roaming or at the residence fixed base provided suitable arrangements have been made, such as with the company owning the corporate network, and the intelligent BSC is aware of them. Then for any call, the subscriber, his present location and the arrangements applicable are considered and the call will be handled in the cheapest manner, for example, letting the PCN operator carry it themselves, letting BT connect it or passing it back to the corporate network for them to handle themselves.

In summary, the invention proposes a mobile communications network including a PCN network and a PABX coupled to the network whereby calls involving mobile subscribers associated with the PABX are routed via the PCN network. In other words a PCN or cellular phone becomes part of a PABX or private network when the subscriber roams into a related cell or cells. Single handset operation of a cordless PABX and a PCN/GSM service can be achieved with automatic discrimination of the service type depending on location. In other words a handset can take on a different service profile when roaming into a certain cell or group of cells comprising a fixed base, the network then handling his calls differently. The base may be a business base and/or a residence base with different tariff structures and possibly different services being applied. In order to achieve this, information with regard to subscribers who have "fixed" locations (business or residence) within the jurisdiction of an MSC has to be available at least at the relevant intelligent BSC as a fixed location register, and will generally also be available at a fixed location register in the MSC. Such functionality is not catered for in the GSM Standard but can be employed without violating the GSM Standard and is thus considered as an enhancement thereto. Furthermore the above proposals allow a cordless PABX/cordless Centrex to be implemented within a BSC rather than an MSC thereby saving transmission and switching expenditure. Networking of a cordless PABX/cordless Centrex service with a PABX as at a corporate site provides integrated fixed/mobile corporate networking. This minimises corporate mobility costs whilst providing a full "find-me" service. Furthermore, integration of transmission for the BTS and the PABX access minimises access costs for corporate networking. Whereas the above generally refers to an intelligent BSC i.e. one which includes MSC functionality, it can alternatively be considered as putting functionality at the BSC rather than the MSC i.e. locating MSC functionality close to the service subscriber. In other words the MSC functionality is moved to where GSM typically puts the BSC rather than moving functionality into the BSC. There is thus a co-location of functionality.

Whilst the invention has been described in terms of GSM it is not to be considered so limited and is also applicable to other "PCN" communications standards/systems particularly those employing equivalent elements to the BTS, BSC and MSC of the GSM system.

We claim:

1. A mobile communications network having mobile subscribers and including a PCN (Personal Communications Network) network, a PABX (Private Automatic Branch Exchange) network coupled to the PCN network, and a local exchange whereby the PCN network and the PABX network are interfaced with a public (PSTN) network, a plurality of said mobile subscribers being normally associated with the PABX network, the PCN network including a base-station transceiver station (BTS), a base station controller (BSC) coupled to the BTS, and a mobile-services switching centre (MSC) coupled to the BSC, wherein there is a direct link between the PABX network and the BSC, wherein the PABX network has a respective jurisdiction associated therewith, wherein there is a further direct link between the BSC and the local exchange for effecting local calls, wherein calls involving mobile subscribers normally associated with the PABX network are routed via the BSC of the PCN network irrespective of whether the mobile subscribers normally associated with the PABX network are located within or outside the jurisdiction of the PABX network, whereby the mobile subscribers normally associated with the PABX network are able to be involved in calls when located within or outside the jurisdiction of the PABX network, wherein radio proximity is used to associate a mobile subscriber to a said network, wherein the network association of both the originating subscriber and the destination subscriber of a call are used to select a network for routing purposes, and wherein the mobile subscribers are able to subscribe to a plurality of services and those services vary automatically in dependence on where said mobile subscribers are located.

2. A network as claimed in claim 1 wherein at the BSC is located MSC functionality.

3. A network as claimed in claim 2 wherein when said mobile subscribers normally associated with the PABX network roam outside of the jurisdiction of the PABX network a different plurality of services are available in comparison to the plurality of services available when located within the jurisdiction of the PABX network.

4. A network as claimed in claim 2, wherein the MSC has a respective jurisdiction associated therewith, wherein the PABX network jurisdiction includes one or more radio cells comprising a first fixed location within the jurisdiction of the MSC and location information regarding said first fixed location is stored at said BSC, whereby when a said mobile subscriber roams into said first fixed location it becomes associated with the PABX network and respective services are provided.

5. A network as claimed in claim 4 wherein the PCN network includes one or more other radio cells comprising a second fixed location within the jurisdiction of the MSC and location information regarding said second fixed location is stored at said BSC whereby when said mobile subscriber roams into said second fixed location respective services are provided.

6. A mobile communications network as claimed in claim 1 wherein the BSC has MSC functionality located thereat and wherein cordless PABX/cordless Centrex operation is implemented within the BSC.

7. A mobile communications network as claimed in claim 2 wherein the BTS is associated with the PABX network and wherein transmission between the BSC and the PABX network and between the BSC and the BTS is integrated onto a single link.

8. A mobile communications network as claimed in claim 4 further including a local PSTN network and wherein local calls between said mobile subscribers associated with said BSC and fixed subscribers of said local PSTN are handled directly by said BSC.

9. A mobile communications network as claimed in claim 5 further including a local PSTN network and wherein local calls between said mobile subscribers associated with said BSC and fixed subscribers of said local PSTN are handled directly by said BSC.

10. A mobile communications network as claimed in claim 2 wherein the PABX forms part of a corporate network and wherein said BSC includes functionality providing a least cost routing service whereby a call from a mobile subscriber can be connected via the corporate network rather than otherwise if it is cheaper and if the mobile subscriber is authorised to use said corporate network.

11. A mobile communications network as claimed in claim 1 wherein when a call is made by a mobile subscriber the cost is billed to an account corresponding to where the mobile subscriber is located.

* * * * *